(12) United States Patent
Isaacman-VanWertz et al.

(10) Patent No.: US 11,733,148 B2
(45) Date of Patent: Aug. 22, 2023

(54) VOLATILITY-RESOLVED CHEMICAL CHARACTERIZATION OF AIRBORNE PARTICLES

(71) Applicant: Aerosol Dynamics Inc., Berkeley, CA (US)

(72) Inventors: Gabriel Isaacman-VanWertz, Blacksburg, VA (US); Nathan M. Kreisberg, Richmond, CA (US); Susanne V. Hering, Berkeley, CA (US)

(73) Assignees: Aerosol Dynamics Inc., Berkeley, CA (US); Virginia Tech Intellectual Properties, Inc., Blacksburg, VA (US)

( * ) Notice: Subject to any disclaimer, the term of this patent is extended or adjusted under 35 U.S.C. 154(b) by 702 days.

(21) Appl. No.: 16/775,033

(22) Filed: Jan. 28, 2020

(65) Prior Publication Data

US 2020/0240894 A1 Jul. 30, 2020

Related U.S. Application Data

(60) Provisional application No. 62/798,386, filed on Jan. 29, 2019.

(51) Int. Cl.
    *G01N 15/14* (2006.01)
    *G01N 15/10* (2006.01)

(52) U.S. Cl.
    CPC ... *G01N 15/1404* (2013.01); *G01N 2015/105* (2013.01)

(58) Field of Classification Search
    None
    See application file for complete search history.

(56) References Cited

U.S. PATENT DOCUMENTS

| | | | | |
|---|---|---|---|---|
| 3,923,398 A | * | 12/1975 | Adler | G01N 21/714 356/311 |
| 4,517,461 A | * | 5/1985 | Crandall | B01D 59/44 250/281 |

(Continued)

FOREIGN PATENT DOCUMENTS

| | | | |
|---|---|---|---|
| GB | 1586490 | * | 3/1981 |
| JP | 11-344478 | * | 12/1999 |

OTHER PUBLICATIONS

International Search Report & The Written Opinion of the International Searching Authority dated May 26, 2020, International Application No. PCT/US2020/015695.

(Continued)

*Primary Examiner* — Daniel S Larkin
(74) *Attorney, Agent, or Firm* — Vierra Magen Marcus LLP

(57) ABSTRACT

A method and apparatus for evaluating the chemical composition of airborne particles by sequentially collecting and analyzing airborne particles in-situ. The method includes: collecting particles; enlarging the particles through water condensation; accelerating the enlarged particles onto a surface to collect enlarged particles; and analyzing the enlarged particles by: isolating the surface; passing a carrier gas over the surface; heating the surface to thermally desorb collected particles into the carrier gas; transporting this evolved vapor into detectors; and assaying the evolved vapor as a function of a desorption temperature. The apparatus includes: a sample flow inlet; a condensational growth tube; a collection and thermal desorption (CTD) cell; a carrier gas source; a heater coupled to the CTD; one or more gas detectors; and a controller configured to operate valves, the heater, the growth tube, and the CTD cell in at least an in-situ sequential collection mode and analysis mode.

22 Claims, 21 Drawing Sheets

(56) References Cited

U.S. PATENT DOCUMENTS

| | | | |
|---|---|---|---|
| 5,110,747 A | 5/1992 | Harvey | |
| 5,177,995 A | 1/1993 | Risch et al. | |
| 5,191,211 A | 3/1993 | Gorman, Jr. | |
| 5,970,803 A | 10/1999 | Staples et al. | |
| 5,983,732 A | 11/1999 | Hering et al. | |
| 6,712,881 B2 | 3/2004 | Hering et al. | |
| 7,029,921 B2* | 4/2006 | Lee | G01N 15/0255 422/70 |
| 7,736,421 B2 | 6/2010 | Hering et al. | |
| 8,088,627 B2 | 1/2012 | Hering et al. | |
| 8,459,572 B2 | 6/2013 | Hering et al. | |
| 8,801,838 B2 | 8/2014 | Hering et al. | |
| 9,610,531 B2 | 4/2017 | Hering et al. | |
| 9,658,139 B2 | 5/2017 | Hering et al. | |
| 9,821,263 B2 | 11/2017 | Hering et al. | |
| 10,252,237 B2 | 4/2019 | Hering et al. | |
| 2003/0138242 A1* | 7/2003 | Gelernt | C23C 16/52 392/394 |
| 2004/0258592 A1* | 12/2004 | Anthony | B01D 53/73 423/225 |
| 2005/0244980 A1 | 11/2005 | Hering et al. | |
| 2015/0276560 A1 | 10/2015 | Tissandier | |
| 2018/0289906 A1* | 10/2018 | Trzecieski | A24F 40/40 |
| 2019/0224637 A1 | 7/2019 | Hering et al. | |
| 2019/0226968 A1 | 7/2019 | Hering et al. | |
| 2019/0265205 A1* | 8/2019 | Spartz | G01N 1/4022 |

OTHER PUBLICATIONS

Turpin, B.J., R.A. Cary, and J.J. Huntzicker. "An In Situ, Time-Resolved Analyzer for Aerosol Organic and Elemental Carbon." Aerosol Science and Technology 12.1 (1990):161-171.

Decarlo, Peter F. et al., "Field-Deployable, High-Resolution, Time-of-Flight Aerosol Mass Spectrometer." American Chemical Society (2006), 78, 8281-8289.

Scanlon, James T. and Donald E. Willis. "Calculation of Flame Ionization Detector Relative Response factors Using the Effective Carbon Number Concept." Journal of Chromatographic Science, (Aug. 1985), vol. 23.

Weber, R.J. et al., "A Particle-into-Liquid Collector for Rapid Measurement of Aerosol Bulk Chemical Composition," Aerosol Science and Technology, (Nov. 30, 3010), 35:3, 718-727.

Williams, Brent J. et al., "An In-Situ Instrument for Speciated Organic Composition of Atmospheric Aerosols: Thermal Desorption Aerosol GC/MS-FID (TAG)." Aerosol Science and Technology, (2006) 40:627-638.

Yamamoto, Masatoshi, "Analysis of Sulfur in Deposited Aerosols by Thermal Decomposition and Sulfur Dioxide Analyzer." Analytical Chemistry (Jul. 15, 2005), 77:4423-4428.

Donahue, N.M., et al.,"A Two-Dimensional Volatility Basis Set: 1. Organic-Aerosol Mixing Thermodynamics." Atmospheric Chemistry and Physics (2011), 11:3303-3318.

Hallquist, M., et al., "The Formation, Properties and Impact of Secondary Organic Aerosol: Current and Emerging Issues." Atmospheric Chemistry and Physics (2009), 9:5155-5236.

Holm, Torkil, "Aspects of the Mechanism of the Flame Ionization Detector." Journal of Chromatography A (1999), 842: 221-227.

Stocker, Thomas F., et al., "Climate Change 2013 The Physical Science Basis", Intergovernmental Panel of Climate Change(2013), 1-33.

Isaacman, G., et al., "Online Derivatization for Hourly Measurements of Gas- and Particle-Phase Semi-Volatile Oxygenated Organic Compounds by Thermal Desorption Aerosol Gas Chromatography (SV-TAG)." Atmospheric Measurement Techniques (2014), 7:4417-4429.

Jimenez, J.L., et al., "Evolution of Organic Aerosols in the Atmosphere." Science 326 (2009),1525.

Ng, N.L., et al., "An Aerosol Chemical Speciation Monitor (ACSM) for Routine Monitoring of the Composition and Mass Concentrations of Ambient Aerosol." Aerosol Science and Technology (2011), 45:780-794.

International Preliminary Report on Patentability dated Aug. 12, 2021, International Application No. PCT/US2020/015695.

\* cited by examiner

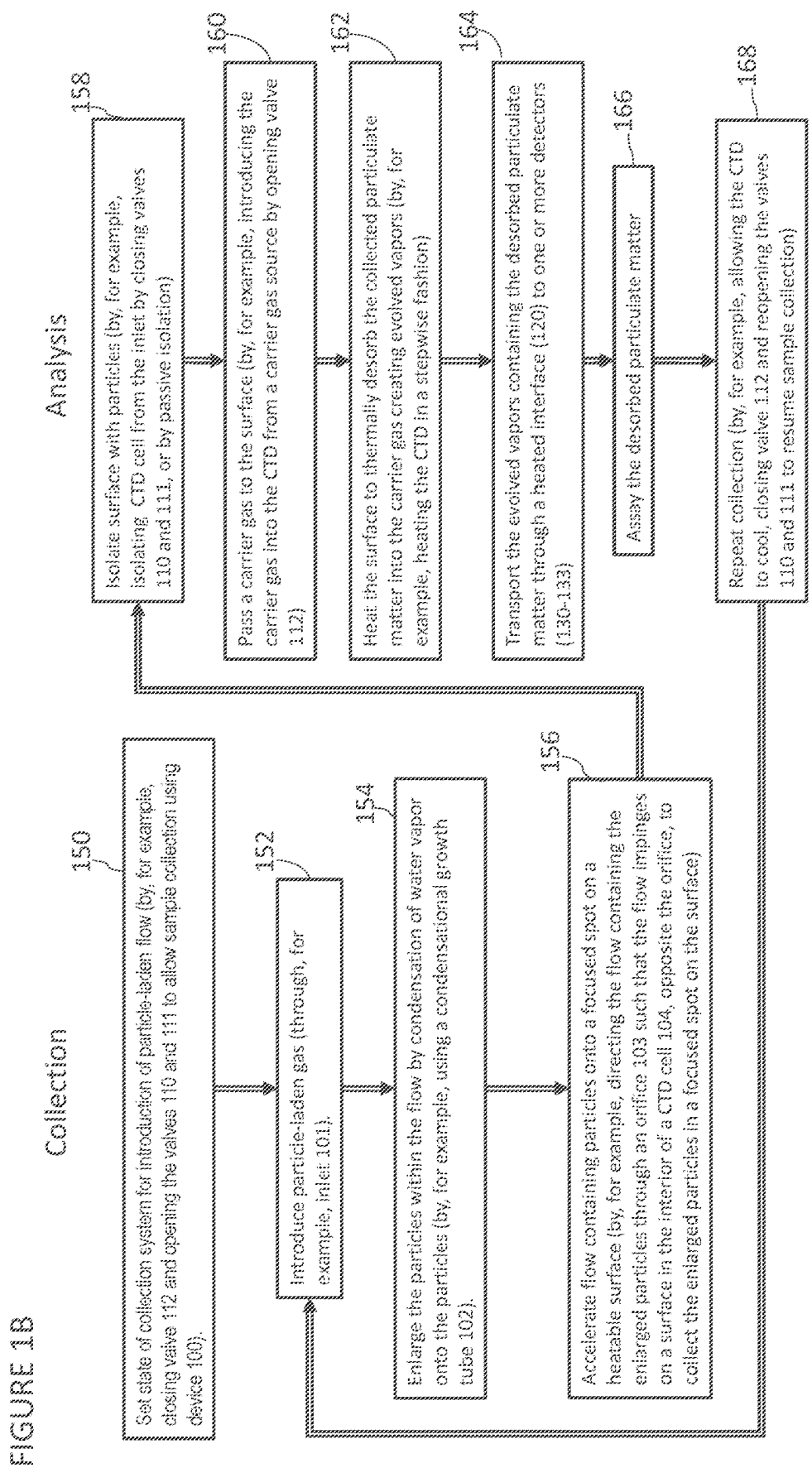

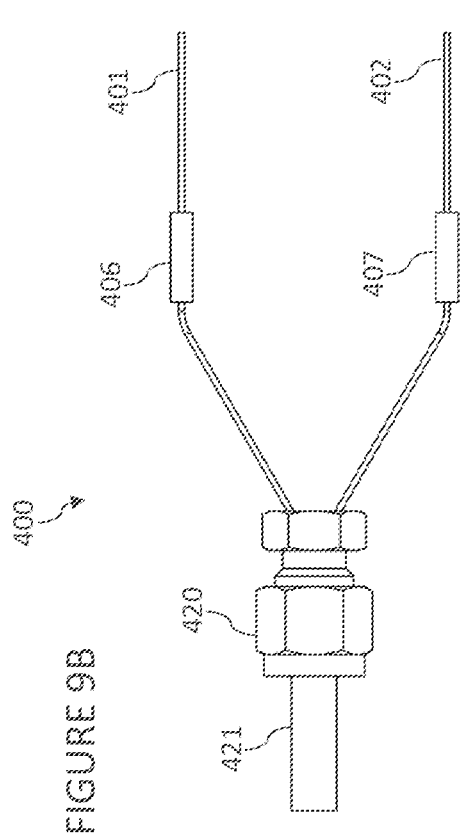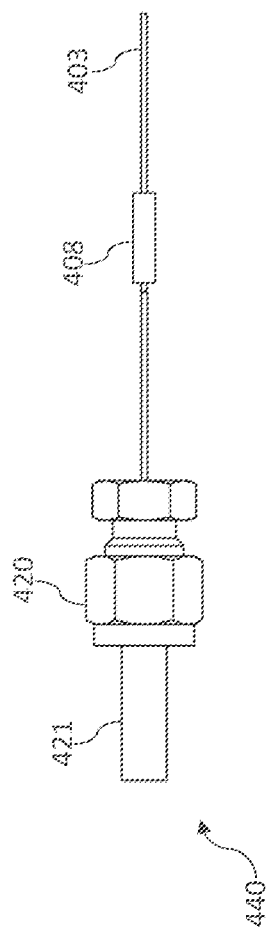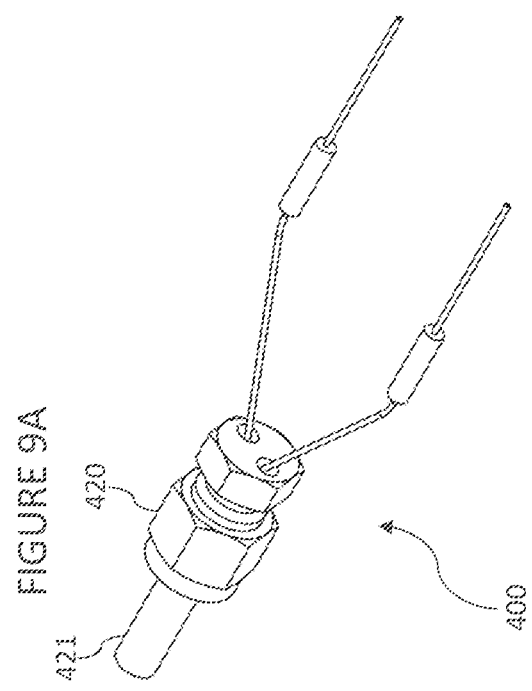

VOLATILITY-RESOLVED CHEMICAL CHARACTERIZATION OF AIRBORNE PARTICLES

This application claims the benefit of U.S. Provisional Patent Application No. 62/798,386 filed on Jan. 29, 2019.

GOVERNMENT RIGHTS

This technology was made with support from the US Department of Energy, under STTR grant number DE-SC0018462. The government has certain rights in this technology.

FIELD

The technology relates to the in-situ chemical characterization of airborne particles, and more specifically to those found in the atmosphere.

BACKGROUND

Although airborne particulate matter has been of environmental concern for decades, only the suspended particulate mass is monitored routinely. Missing are extended data sets of hourly, or even daily, aerosol chemical composition. Yet such time-resolved chemical data are key to advancing the understanding the effects, sources and formation mechanisms of atmospheric aerosols. The lack of continuous chemical composition data limits understanding of atmospheric aerosol transformations such as growth and loss through condensation, chemical reactions, and volatilization. It constrains our understanding of aerosol sources, and hampers the evaluation of aerosol effects on atmospheric visibility, on the formation and persistence of clouds, and on hydrodynamic cycles. In these ways, the paucity of chemical data has stymied efforts to improve models of particulate matter and their effects.

Over the years, researchers have developed several types of instruments to provide in-situ, time-resolved chemical characterization of airborne particles. These include the several particle-beam mass spectrometers, as well as on-line ion chromatography systems, and on-line gas chromatography. While these methods provide valuable, aerosol chemical characterization, operational and data processing costs are significant.

SUMMARY

The present technology, roughly described, pertains to automated, semi-continuous chemical characterization of airborne particles through measurement, as a function of compound volatility, of the mass concentration carbon, nitrogen and sulfur, and, for non-refractory constituents, the ratio of oxygen to carbon.

One general aspect of the technology includes a method for evaluating the chemical composition of airborne particles sequentially collecting and analyzing airborne particles in-situ. The method includes collecting the particles by: introducing airborne particles in a gas flow through an inlet; enlarging the airborne particles through water condensation; accelerating the gas flow containing enlarged particles onto a surface to collect enlarged particles in a focused area on the surface by passing the flow through an orifice. And the method includes analyzing the enlarged particles by: isolating the surface from the inlet; passing an inert or oxygen containing carrier gas over the surface; heating the surface to thermally desorb collected particles on the surface into the carrier gas, thereby forming an evolved vapor including the chemical constituents and decomposition products of the collected particles; transporting the evolved vapor through a heated interface into one or more detectors; and assaying the evolved vapor as a function of a desorption temperature.

The method further includes repeating the collecting and analyzing automatically using a controller including switching between the sequentially collecting and analyzing by controlling one or more valves, gas flows and heaters. The heating of the surface may include heating the surface in a stepwise manner, such that the surface temperature held steady for a prescribed period of time prior to a next temperature increase. The assaying may be performed using a flame ionization detector connected to a detector for carbon dioxide. The assaying includes removing water vapor in the flow exiting the flame ionization detector. An oxygen to carbon ratio in evolved vapors in the flow exiting the flame ionization detector is determined from a ratio in detectable carbon mass from the flame ionization detector to a mass of carbon detected as carbon dioxide. The mass of carbon and the oxygen to carbon ratio in the evolved vapors is determined as a function of the desorption temperature. The method further includes introducing an oxygen-bearing carrier gas to evolve a refractory carbonaceous material. The method further includes calibrating the one or more detectors by introducing gas standards into one or more detectors. The method further includes calibrating the one or more detectors introducing liquid standards into a collection cell. Passing an inert or oxygen containing carrier gas over the collected particles includes introducing the carrier gas through the orifice and through a side port of a collection cell and constraining the flow to exit through a second side port of the collection cell. The surface may be in a collection cell and the isolating may include closing a valve placed between the collection cell and the inlet, and where the isolating may include redirecting the flow containing the condensationally enlarged particles to an exhaust to bypass the collection cell, and simultaneously introducing an excess of carrier gas above the orifice.

Another aspect includes an apparatus. The apparatus includes a sample flow inlet; one or more condensational growth tubes coupled to the sample flow inlet; at least one vacuum valve; a collection and thermal desorption (CTD) cell adapted to receive an output of the one or more condensational growth tubes onto a surface of the CTD through an acceleration nozzle; a carrier gas source and an interface including a carrier gas valve configured to provide carrier gas into the CTD; a heater coupled to the CTD configured to selectively heat the CTD; a heated transport interface coupled between the CTD and one or more gas detectors or detector trains; and a controller coupled to the carrier gas and vacuum valves, the heater, the heated transport interface, the one or more condensational growth tubes, and the CTD cell, the controller configured to operate the valves, the controlled heater, the heated transport lines, the one or more condensational growth tubes, and the CTD cell in at least an in-situ sequential collection mode and analysis mode.

Implementations may include one or more of the following features. The apparatus where the one or more detectors may include a flame ionization detector (FID). The one or more detectors may include a flame ionization detector (FID) and a nondispersive infrared detector (NDIR). The apparatus may include an interface configured to remove water vapor produced by a hydrogen flame of the flame ionization detector prior to introduction into the nondispersive infrared detector. The apparatus further including interface configured to introduce either gas or liquid standards from a gas or liquid standards source to the CTD cell. The CTD may be fabricated from fused quartz. The CTD may also be fabricated from stainless steel and has surfaces which are chemically passivated. The collection cell may have an internal volume of less than 1 cm3.

BRIEF DESCRIPTION OF THE DRAWINGS

Aspects of the present disclosure are illustrated by way of example and are not limited by the accompanying figures (FIGS.) for which like references indicate elements.

FIG. 1B is a flow chart of a method for evaluating the chemical composition of airborne particles, showing collection and analysis modes of the method.

FIG. 9A is a perspective view, and FIG. 9B is a plan view, of a heated splitter (or interface) that distributes the flow from the CTD between parallel detectors between the CTD and the detectors.

FIG. 9C is a plan view of a heated interface for use with a single detector or detector train.

DETAILED DESCRIPTION

Technology is provided for an easily maintained, automated method to provide the critical chemical compositional data in a manner suitable for routine field monitoring. The technology combines a focused, low-pressure drop ultrafine particle collection, thermal transfer, and proven, cost-effective gas analyzer technologies. Measured constituents include hourly concentrations of (1) volatility-resolved organic carbon, and (2) the oxygen to carbon ratio (O:C) in each volatility bin and (3) aerosol sulfur and nitrogen. The volatility and the extent of oxygenation are important parameterizations for modeling the complex organic fraction of atmospheric aerosols. The sulfur and nitrogen measurements capture the majority of the inorganic fraction. The method of this technology may be automated to yield hourly data of these key aerosol chemical components. Further, it is amenable to automated, in-field calibration of the detectors with gaseous standards, thereby improving data quality while reducing operational costs.

In one aspect, the technology is a semi-continuous, in-situ method and apparatus for the chemical characterization of airborne particles. The particles that are assayed range generally from the nanometer (e.g. ~2-5 nm) to the micrometer (1-3 µm) size range. The chemical characterization involves the determination, as a function of compound volatility, of the mass concentration carbon, nitrogen and sulfur, and, for non-refractory constituents, the ratio of oxygen to carbon. In one implementation, it is tailored to particles with diameters in the size range from 5 nm to 2500 nm.

One unique aspect of the technology is focused collection of atmospheric particles with low pressure drop, followed by thermal desorption and analysis by standardly available gas chromatography detectors. Focused collection is accomplished by first enlarging particulate matter through water condensation, and subsequently impacting the droplets formed into a collection and thermal desorption (CTD) cell. The thermal desorption is performed by heating the cell in a controlled manner. The detectors assay the evolved carbon, nitrogen and sulfur as a function of the desorption temperature. In a further aspect, coupling two types of carbon detectors, a flame ionization detector and non-dispersive infrared detector, are coupled together to infer the oxygen to carbon ratio in the desorbed vapors.

Figure 1A:
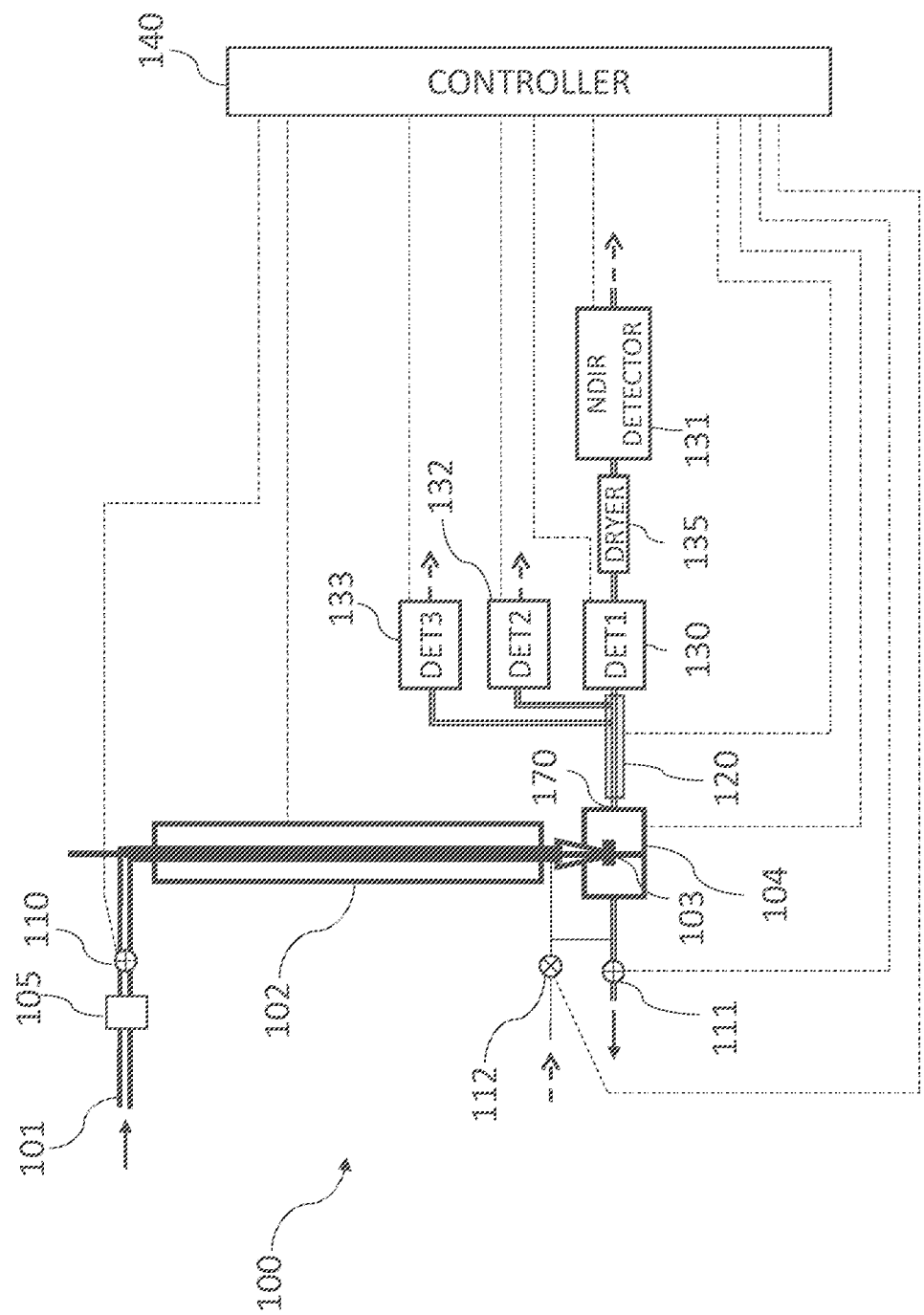
FIG. 1A is a schematic of an apparatus comprising the condensation growth tube, a collection and thermal desorption cell, transport lines and an array of detectors or detector trains.

FIG. 1A illustrates a collection and analysis system 100 of the present technology. The system 100 has three modes of operation: (1) collection; (2) desorption and analysis, and (3)

calibration. In one exemplary operating procedure, the method cycles between collection and analysis modes, with cycle times of around one hour for collection and one hour for analysis. Far less frequently, typically once per day, the method enters the calibration mode for a period of several minutes and then returns to the collection and analysis cycle. The system 100 may include an inlet 101 coupled to a water-based condensation growth tube 102, at the output of which is a CTD cell 104. An optional precut 105 may be provided at the inlet. An isolation valve 110 and pump valve 111 function as described below. One or more detectors 130-133 are coupled through an interface (which may be heated) to the output of the CTD cell. A system controller 140 is operably coupled to the elements as shown in FIG. 1A. It should be understood that each of the elements in FIG. 1A may be provided in a unitary housing (not shown) to allow the system to be portable.

Collection Mode

In the collection mode, airborne particles are introduced through an inlet 101 into a water-based condensation growth tube 102 and are collected by impaction in a CTD cell 104. Optionally, a precut 105 may be used at the inlet to remove coarse particles, such as those larger than 1 μm, or those larger than 2.5 μm, as desired for the specific application. An isolation valve 110 may be located between the inlet 101 and the condensation growth tube 102, and if present, is open during the collection step. Alternatively, this isolation valve may also be located immediately below the growth tube 102. In FIG. 1A, both double and single lines interconnecting the various elements represent appropriately sized conduits or tubes.

The condensational growth 102 tube may be one of various convective diffusive methods (such as, for example, those described in U.S. Pat. Nos. 6,712,881, 8,801,838, and 10,252,237) to produce condensational growth on airborne particles. These generally consist of passing the flow through a wet-walled tube with multiple temperature regions. In one configuration there are three radially symmetric temperature regions, wherein the middle region is warmer than the first and third regions, as described in U.S. Pat. No. 8,801,838. In another configuration, the temperature regions are configured such that, at least for one portion of the condensation growth tube the temperatures on opposing walls differ. The condensation growth tube may also utilize a parallel plate configuration or may consist of multiple tubes or plates operated in parallel, as described in the aforementioned patents. While the single tube configuration is suitable for sampling rates of a few liters of air per minute, the multiple tube and parallel plate configurations are amenable to higher flow rates while maintaining a compact package.

Focused collection is accomplished through impaction of the droplets formed from the condensational growth into the CTD cell. The flow exiting the condensation growth tube 102 passes through a focusing nozzle 103 at the entrance of the CTD cell 104. The flow then exits the CTD cell 104 through a pump valve 111 to a vacuum pump (not shown). The droplets formed within the growth tube are unable to follow the approximately right angle turn in the flow and collect by impaction on a surface on the inner wall of the CTD cell 104 immediately opposite the focusing nozzle 103. For a sample flow rate of 1-2 L/min, the diameter of the focusing nozzle is near 1 mm, and the particles deposit in a single spot that may be less than 5 mm in diameter. More specifically, the focusing nozzle is sized with respect to the sample flow rate through the nozzle such that the Stokes number, which is the nondimensional ratio known in the art to govern the impaction of particles, is greater than 0.2 for a 1.2 μm diameter particle. The Stokes number is defined as the product of the particle stopping distance and the average velocity in the nozzle, divided by the nozzle radius, and may be expressed in terms of the flow rate Q through the nozzle, the particle density $\rho_p$, the particle diameter $D_p$, the Cunningham Slip Factor C, and the air viscosity μ, and the nozzle diameter $D_n$, as $(\rho_p\ 4D_p^2\ QC)/(9\pi\mu\ D_n^3)$. More simply, for this method when sampling the atmosphere at ambient pressures, the ratio $Q/D_n^3$ must be greater than $1.5\times10^4$ s$^{-1}$. The surface of the CTD on which the particles deposit may be slightly heated, to maintain a temperature of 25-30° C., thereby facilitating the evaporation of the water on the droplets, and forming a mostly dry deposit. The internal volume of the CTD cell, is of the order of a few cubic centimeters or less. The particle collection is performed with very low pressure drop; that is, the pressure within the CTD during collection is within a few percent of the ambient pressure at the inlet 101.

During the collection, the detectors 130-133 are isolated from the CTD by means of a small back flow of a few cubic centimeters per minute from the detectors to the CTD through the heated interface 120. The interface 120 typically contains a capillary that provides a flow restriction between the detectors and the CTD, and this flow restriction, coupled with the small pressure drop between the detectors and the CTD, limit the amount of this back flow. The back-flow exhausts with the sample flow through valve 111.

As enumerated below, it is significant to this technology that this focused collection occurs at low pressure drop. This distinguishes this CTD cell from that used in the thermal desorption gas chromatograph (such as in U.S. Pat. No. 8,088,627) wherein the pressure at the point of collection is less than one half of that at the inlet. In the prior art, this large, (factor of two), pressure drop was required to deposit particles as small as 0.1 μm, as these small particles could only be collected using high, approximately sonic velocity flows. With the present technology, it is possible to collect much smaller particles, as small as a few nanometers in diameter, at pressure drop of a few percent of the absolute pressure at the inlet. Were a filter material used for the collection step, not only would the sample be spread over a larger area, it would also be subject to higher temperatures during thermal desorption as it diffused through the filter material, increasing the probability of decomposition that adversely affects the measurements.

Analysis Mode:

In the analysis mode, the isolation valve 110 is shut, as is the pump valve 111. An inert carrier gas such as Helium or Nitrogen, is then introduced from a carrier gas source into the cell by opening a valve or controller 112, such that the inert carrier flow is directed through both the focusing nozzle 103 and the side port 170 of the CTD 104. This flow is carried through a heated interface line 120 to one or more detectors 130-133. Although three detectors 120-133 are illustrated, more or fewer detectors may be used in accordance with the present technology. After a brief purge, thermal desorption is done by heating the CTD cell 114 in a controlled manner. This thermal desorption is done in place, without physically moving the cell or the surface on which the particulate material is deposited. Further, the internal volume of the cell is sufficiently small to be completely swept by the carrier gas within a period of several seconds, thereby providing readily detectable concentrations of evolved vapors. The detector(s) 130-133 subsequently assays the thermally desorbed material as a function of the desorption temperature. The type of analysis depends on the detector(s) used. The detectors may be any of a number of commonly used detectors on gas chromatography systems such as a flame ionization detector (FPD) for sulfur species, a nitrogen phosphorous detector (NPD), or a flame ionization detector (FID) for carbon. One option illustrated in FIG. 1A is to couple two types of detectors in series, as illustrated by detectors 130 and 131. These could be two types of carbon detectors, wherein 130 is a flame ionization detector, and 131 is a non-dispersive infrared detector for CO2, from which it is possible to infer the oxygen to carbon ratio in the desorbed vapors. This detector train also includes a dryer 135 to remove water vapor produced by the hydrogen flame of detector 130, before entering detector 131. This detector train may be operated in parallel with other detectors, such as 132 or 133.

During the analysis mode the CTD is heated, desorbing the collected sample material into the carrier gas introduced through valve 112 at the upstream side of the focusing nozzle 103 and at the CTD side port 114. The carrier gas and the evolved vapors from the desorbed sample is carried via a heated interface 120 to the detectors. The detectors assay the concentration in the gas phase of their target analyte, that is the FPD detects gaseous sulfur compounds, the NPD detects both nitrogen and phosphorous compounds, the FID responds to carbonaceous compounds, and NDIR to the total CO2. The total mass of evolved material of each of these species is determined by integration over each thermal step of the product of the measured analyte concentration, expressed in mass per unit volume of gas, and the carrier gas flow rate.

Calibration Mode:

In calibration mode, a calibration gas is introduced into the carrier flow upstream of valve 112, such that the carrier gas contains known concentrations of one or more analytes of interest. This provides a means to calibrate the gas detectors 130-133. For example, a standard of sulfur dioxide may be used to calibrate the FPD, a standard of methane may be used to calibrate the FID, or carbon dioxide to calibrate the NDIR. These standards pass through the CTD cell 104, exactly as would the carrier gas during analysis; however, generally the CTD cell need not be heated. Multipoint calibrations are achieved by introducing gaseous standards at varying concentrations, as described below. This mode of operating is readily automated, and can be done on a routine basis, such as once per day. An alternate calibration procedure is to introduce liquid calibrants of known mass directly into the CTD cell 104, and to then thermally desorb and analyze this calibrant following the analysis mode procedures described above.

The technology may be automated by means of a controller 140 that can be a computer or specifically constructed hardware or microprocessor which automates flow control, valve opening/closing, heater control, detector monitoring and analysis. The controller provides signals to open and close the valves in the system (eg. 110, 111, 112). The controller 140 is illustrated as having a plurality of electrical connections to the valves 110, 111, 112, CTD 104, heated interface 120, and gas detectors 130-133, controller 140 controls the flows introduced at valve 112, as well as flows needed to support the various detectors 130-133. The controller also monitors and controls the heater on the CTD cell 104 and the interface 120, as well as the temperatures of the various regions of the condensation growth tube 102. The controller captures the signals from each of the detectors 130-133, and processes the data to yield the airborne concentrations. The controller may additionally monitor the sample flow, as well as other flows, pressures and temperatures that serve as quality assurance data indicating operational status of the system.

FIG. 1B is a chart illustrating a method in accordance with the present technology for evaluating the chemical composition of airborne particles. The method may incorporate collection and analysis mode in, for example, the system 100 shown in FIG. 1A. At step 150, to enable collection mode in system 100, the valves 110 and 111 are set to open providing an open flow path from the inlet 101 through the growth tube 102 and CTD cell 104 to the pump, and the valve 112 to the carrier gas flow is closed. At step 152, a particle laden gas is introduced to the method. In system 100, this may be an air stream, typically containing airborne particulate matter, which is introduced through inlet 101. The method may optionally restrict the size of the particles in the particle laden stream. In system 100, the inlet 101 may optionally include a precut 102 to remove those particles above a selected size, such as 1 um or 2.5 um. The remaining particles, typically as small as 5 nm in diameter, remain suspended in the flow. At step 154, the particles are enlarged within the flow by condensation of water vapor on the particles. In system 100, a particle laden flow enters a condensation growth tube 102. The condensation growth tube 102 creates a region of water vapor supersaturation within a large region of the flow, where supersaturation refers to conditions of relative humidity above 100%. Typically portions of the flow in the growth tube reach relative humidity values in the range of 120% to 180%. This supersaturation induces the condensation of water vapor onto the particles as small as 3 to 7 nm, and results in the formation of enlarged particles greater than 1 um in diameter. At step 156, the flow containing enlarged particles is accelerated toward a focused spot on a heatable surface. In system 100, the flow containing the enlarged particles is directed through an orifice, or nozzle, 103 contained within or attached to an input of, CTD cell 104, such that the flow impinges on a surface of the CTD cell 104 opposite the exit of the nozzle 103, causing the enlarged particles in the flow to deposit on this surface. Typically, the air flow is of the order of 1-2 L/min. During this step, in system 100, a small back flow of a few cm3/min flows from the detectors to the CTD, and exhausts with the air flow through valve 111. This back flow provides passive isolation of the detectors during sample collection.

At the end of a prescribed collection period, typically 30 to 50 minutes, the method moves to analysis of the collected particles. At step 158, the heatable surface having the collected particles is isolated. In system 100, step 158 is performed by switching valves to enter into analysis mode. Specifically, the inlet 101 is isolated from the CTD cell 104 by closing valves 110 and 111, or alternatively, by a passive structure, described below with respect to FIG. 5. At step 160, a carrier gas is introduced to the heatable surface from a carrier gas source. In system 100, this is performed by opening valve 112 to introduce carrier gas into the CTD cell 104. Next, at step 162, the heatable surface having the collected particles is heated. In one embodiment, heating may be performed in a step-wise fashion. In system 100, the CTD is heated in a stepwise fashion. For example, CTD cell 104 may be warmed in 50° C. degree increments, with a rapid adjustment to the first temperature setting of 50° C., a hold at that temperature for several tens of seconds, followed by a rapid increase to 100° C., another hold at 100° C., and so on continuing to 400° C., or more. As the CTD cell 104 is heated, constituents contained within the particulate matter evaporate into the carrier gas creating evolved vapors which contain the chemical constituents of the particles. At step 164, the evolved vapors are transported through a heated interface to one or more detectors. In system 100, the evolved vapors are carried through the heated transport interface 120 to the detectors 130-133. For the initial heating steps (in step-wise heating), from the initial temperature to a temperature around 300° C. to 350° C., the carrier gas is devoid of oxygen, typically either helium or nitrogen. This minimizes the oxygenation and chemical transformation of the particulate matter during the thermal desorption. Subsequently, the carrier gas may be switched to one containing oxygen, i.e. air, and the CTD cell is heated to 400° C. or more, allowing the refractory carbonaceous material to decompose to vapor products that are transferred into the carrier gas. The carrier gas transports the vapor products resulting from the thermal desorption from the CTD cell, through the heated interface 120, to the one or more detectors. Typically, the amount of the carrier gas is controlled by means of mass flow controllers, as described below. At step 166, the desorbed particulate matter contained in the evolved vapors are assayed. In system 100, step 166 is performed by the detectors which assay the specific constituents contained in the vapor products. At the end of the analysis period, collection may be repeated at step 168. In system 100, the heater on the CTD cell 104 is turned off, the CTD cell 104 is allowed to cool, (or may be actively cooled by means of a fan), the carrier gas flow valve 112 is closed, the isolation and pump valves 110 and 111 are opened, and the collection mode resumes. A typical cycle period is one hour.

An important feature of the method as implemented by system 100 or the below-described systems is that there are no moving mechanical parts, apart from internal components in the valves. The thermal desorption is done without physically moving the collection surface. The switching between collection and analysis modes is handled entirely by the switching of valves, and control of the CTD heater. Another important feature is the passive isolation between the detectors and the CTD provided by the heated interface 120. Efficient transport of the vapors produced from the thermal desorption of the collected particulate matter requires a heated transport line, typically 300-400° C. This is difficult to achieve in a reliable manner using a valve. The passive isolation provided by the restriction in the heated interface 120 is a far more reliable, and is far more amenable to use of multiple detectors in parallel.

Figure 2:
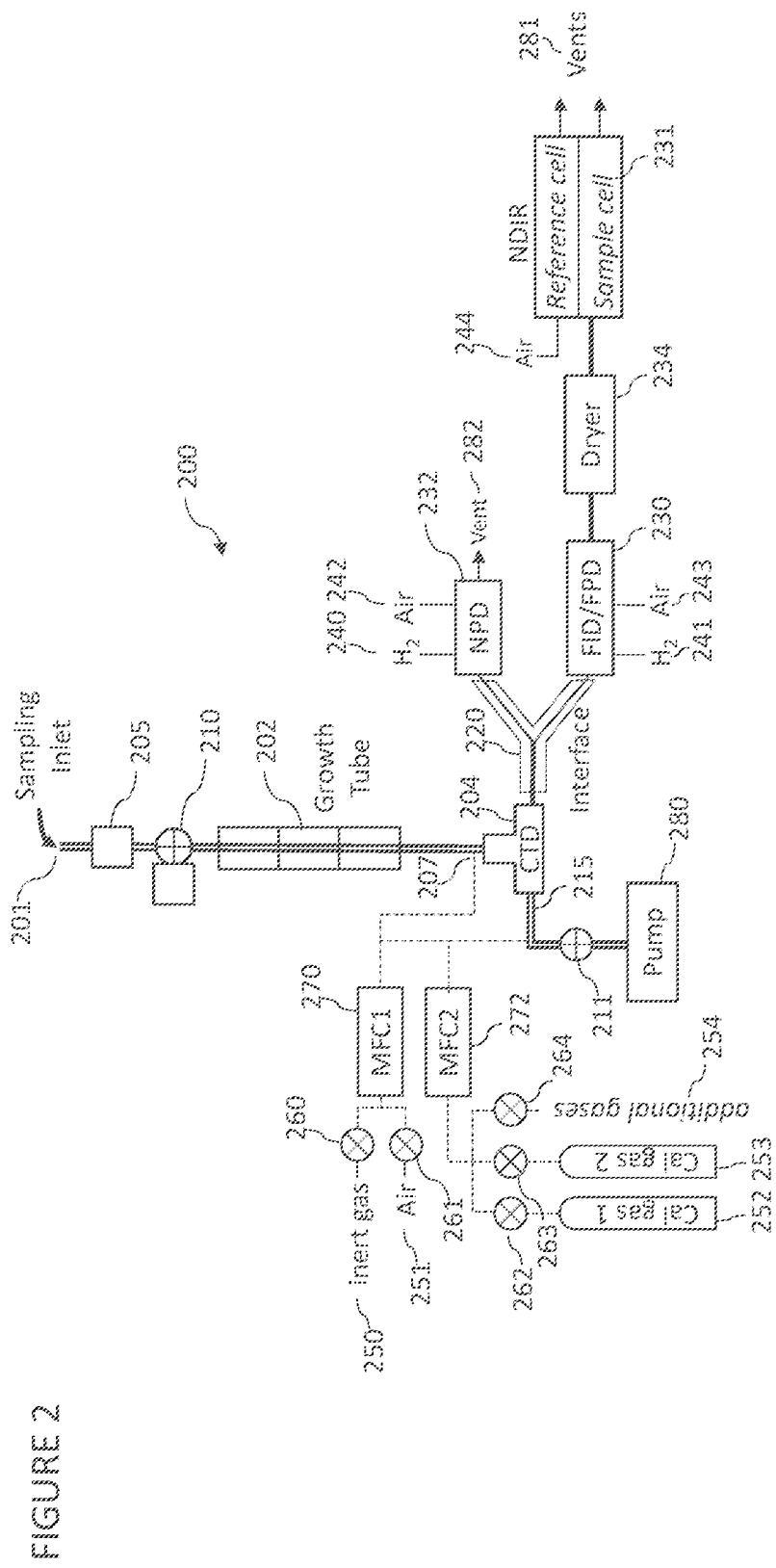
FIG. 2 shows another aspect of the apparatus using several detectors, with flow controls and paths shown.
Figure 3:
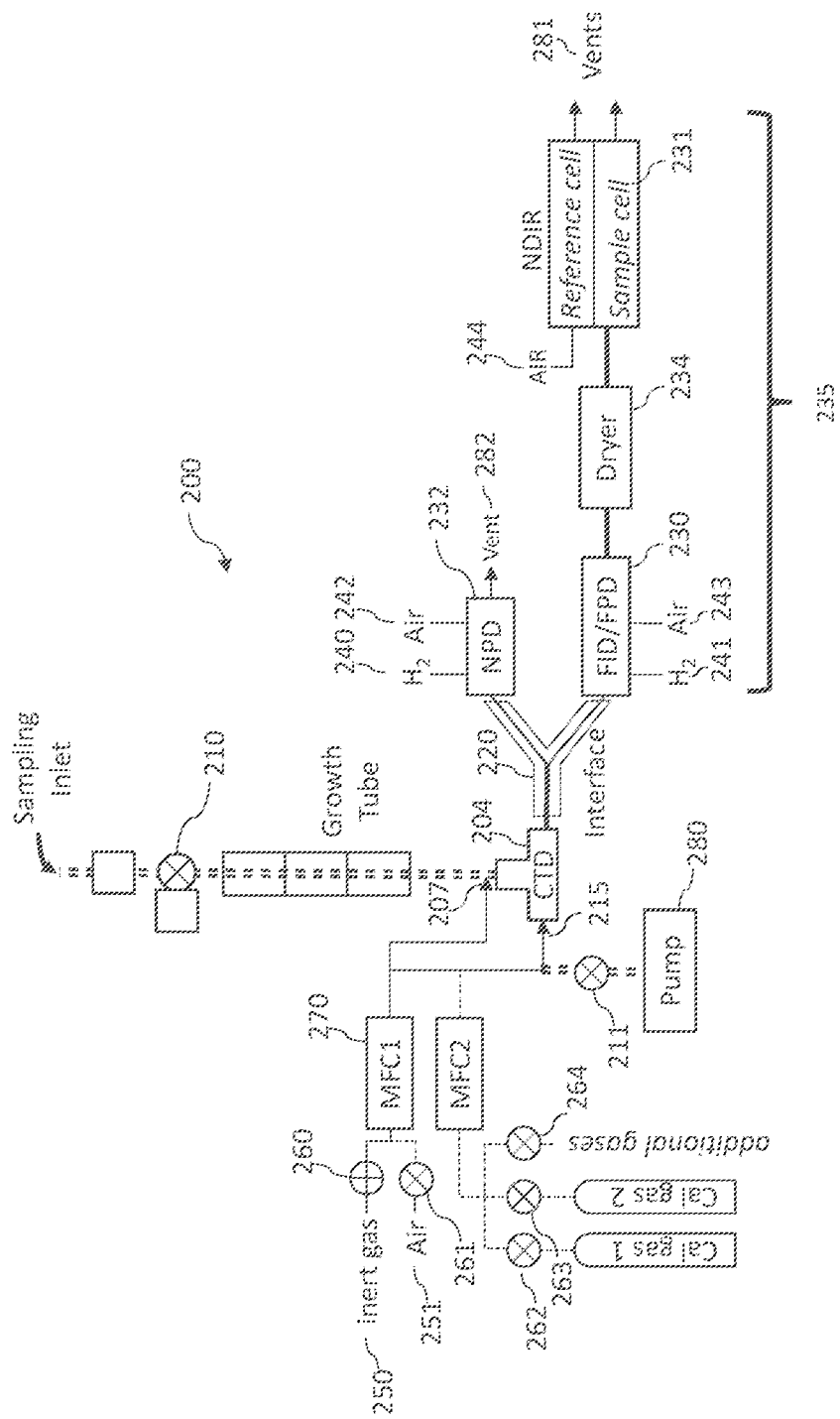
FIG. 3 shows the system of FIG. 2 with valves positioned for analysis mode, wherein carrier gas is introduced into the cell and transported to the detectors.
Figure 4:
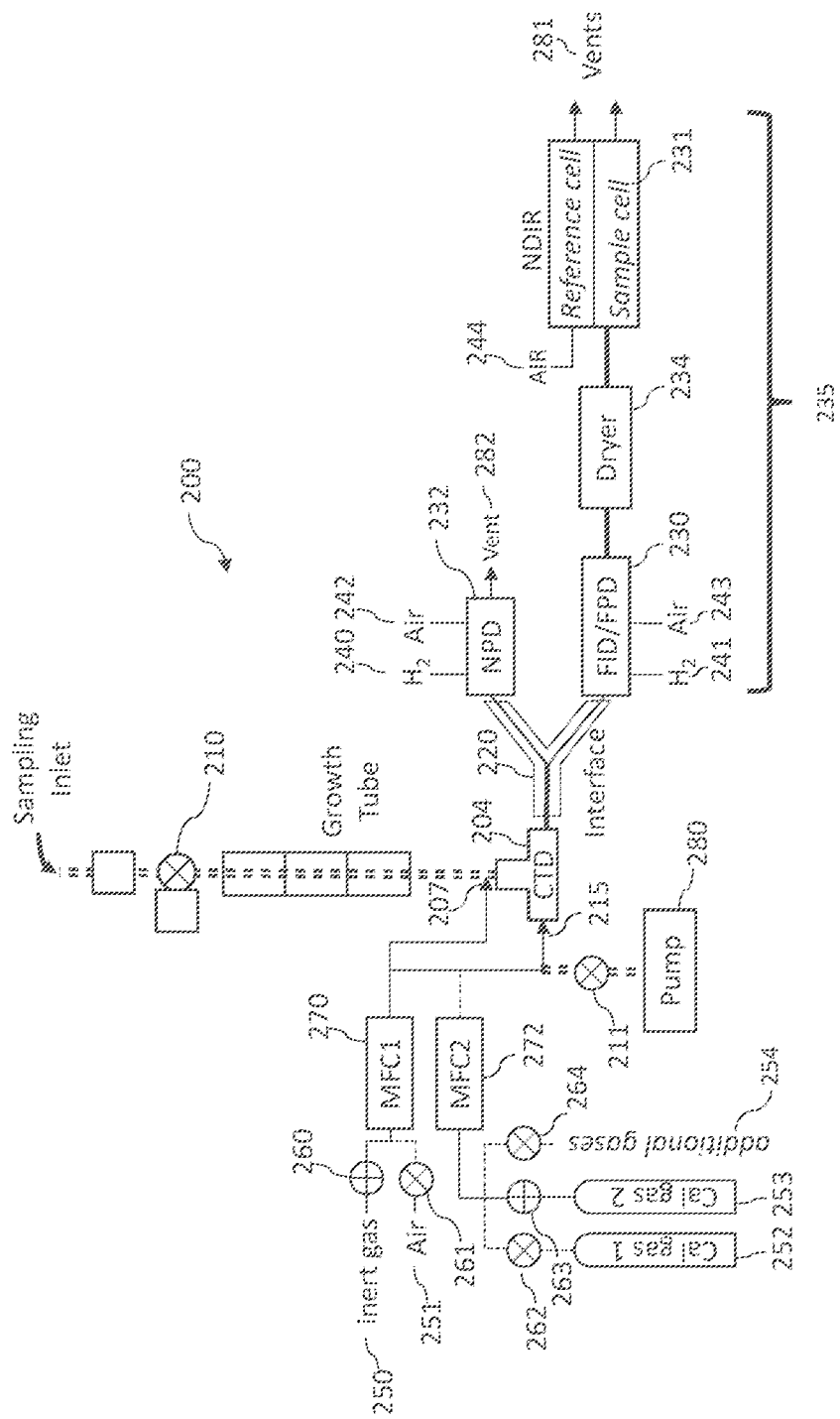
FIG. 4 shows the system of FIG. 2 with valves positioned for calibration mode wherein a gas of known concentration is introduced through the CTD cell to the detectors, thereby allowing calibration of the detectors in-situ.

FIG. 2 illustrates further detail of a specific implementation of the apparatus and method for the collection and analysis of non-oxygenated carbon, total carbon, sulfur, nitrogen and phosphorous. System 200 should be understood to perform the method of FIG. 1B with like components to those described above with respect to FIG. 1A. As noted above, the system 200 has two primary modes of operation: sample collection and sample analysis. It may also be configured to have a calibration mode. The system switches among these modes by switching valves, as enumerated below. In the following embodiments, the controller 140 is present, but not illustrated for the sake of clarity. It should be understood that the opening and closing of all valves, heater control, detection, gas control flow and analysis may be operated by the controller using for example instructions in the form of computer code operable to instruct the controller to initiate correct configuration of all valves, heater control, detection, gas control flow and analysis as described herein.

In FIG. 2, the system 200 is illustrated in collection mode where valves 210 and 211 are positioned such that double solid lines show the flow paths of the sampled air flow, single solid lines show the flow paths of the various gas streams feeding the detectors, and dashed lines are stagnant. (All such lines should be understood to represent appropriately sized physical conduits or tubes, whether solid or dashed.)

The system 200 may include a nitrogen phosphorous detector (NPD) 232, and a combined flame photometric (FPD) and flame ionization detector (FID) 230, and a nondispersive infrared $CO_2$ detector (NDIR) 231 coupled in series through a dryer 234 to the FID/FPD 230. The NPD detector assays the mass of nitrogen and phosphorous in the evolved vapors, from which the nitrogen and phosphorous content of the collected particles is determined. The FPD detector assays the mass of sulfur in the evolved vapors, from which the mass of sulfur in the collected particles is determined. The FID detector measures ions produced in the hydrogen flame, and this signal is proportional to the mass of carbon associated with aliphatic organic compounds, i.e. those that are not oxygenated, and to a lesser degree to those that contain oxygen. The FID also converts all of the carbon in the assayed vapors to $CO_2$. The NDIR detector measures the $CO_2$, from which the total carbon mass of the sample is determined. The FPD detects sulfur species through optical measurement of the hydrogen flame, while the FID detector measures the thermionic emissions produced in the hydrogen flame. In the implementation shown in FIG. 2, these two detectors share a common hydrogen flame. FIG. 2 shows the support and reference gases 240-244 for these detectors, as well as two carrier types of carrier gases, 250 and 251 (provided from an inert or carrier gas source (not shown)), and calibration gases 252-254. The detector support gases include $H_2$ flows 240 and 241, and air flows 242 and 243, to support the hydrogen flame utilized by these detectors. The air flow 244 is comprised of reference air against which the NDIR signal from the flow exiting the FID/FPD 230 and dryer 234 is compared and is from the same source as the air flow 243 entering the FID/FPD 230. Generally, the $H_2$ may be supplied by a compressed cylinder or a hydrogen generator. The air may be from a dry air source, or may simply be compressed, filtered ambient air which is passed through a 1-2 L buffer volume prior to the inlet of the detector smooth out variations in the background carbon dioxide concentrations. A portion of this air stream also serves as the reference flow 244. The carrier gases 250 and 251, are inert and oxygenated (e.g. air) flows into which the collected sample material may be desorbed.

Figure 5:
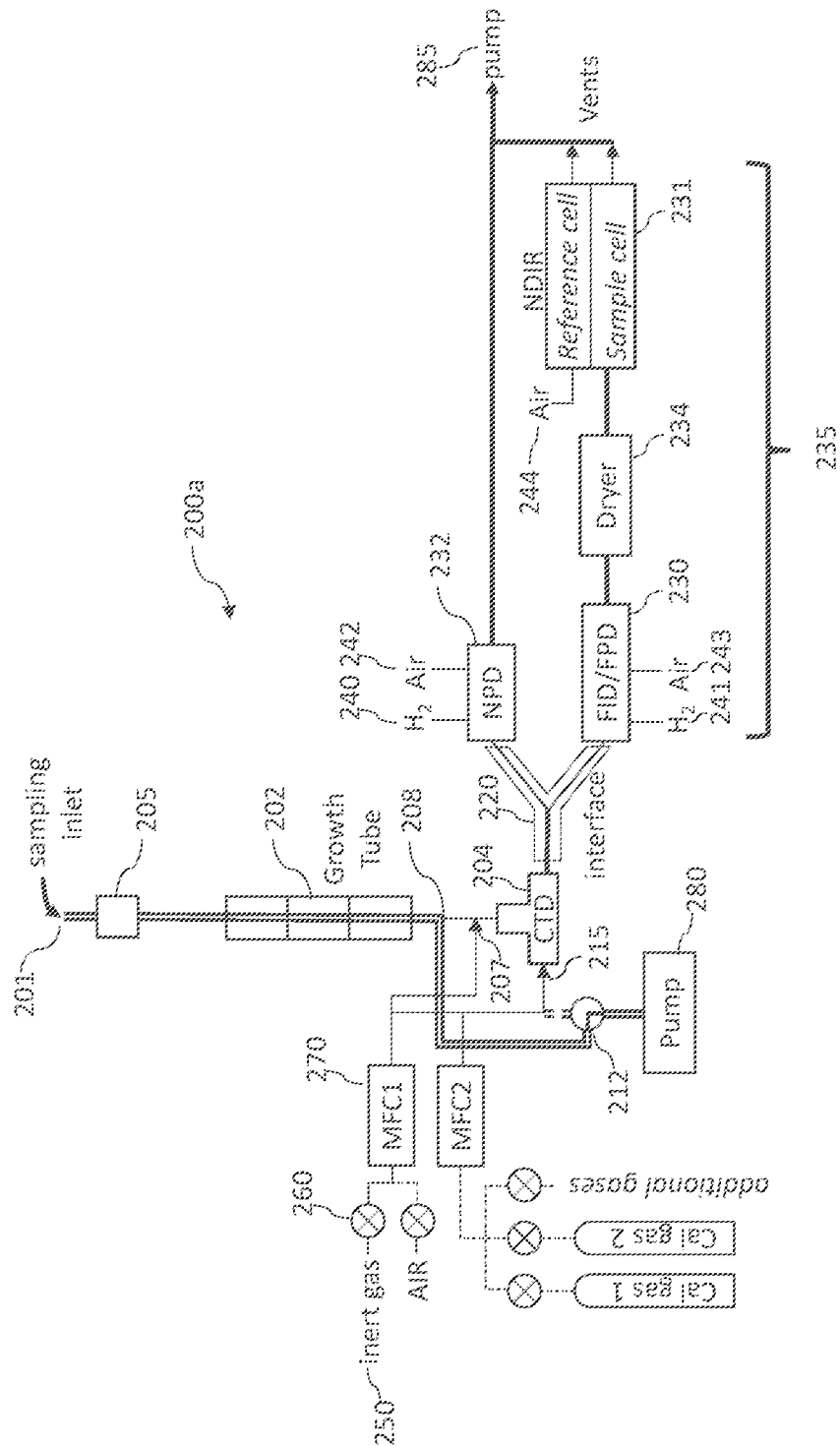
FIG. 5 illustrates an alternate implementation of the system in which the valve 110 is eliminated, and in its place the flow of carrier gas to the detectors in the analysis mode is handled by a passive split, wherein a slight excess of carrier gas is introduced.

As noted, FIG. 2 illustrates the flow path in sample collection mode. In this collection mode, the isolation valve 210 and pumping valve 211 are open, the carrier gas valves 260 and 261 are closed, and the calibration gas valves 262-264 are also closed. Air is pulled through the sample inlet 201, through an optional pre-cutter 205, through the condensation growth tube 202, through the collection and thermal desorption cell 204, to the pump 280. In one embodiment, the isolation valve 210 is an automated ball valve such that the flow path of the sample stream is straight. As noted, pre-cutter 205 is optional, and may be used to remove particles larger than are of interest to the user. Pre-cutter 205 may be configured to provide a cut point at 2.5 µm, excluding particles larger than this size to provide a "PM-2.5" sample, as described by Environmental Protection Agency (EPA) regulations. Alternatively, it may be configured to provide a cut point at 1 µm, as is frequently used in atmospheric research studies. Notably, various other cut sizes may be used. The condensation growth tube 202 generally consists of a wet-walled tube with multiple temperature regions through which the flow passes, wherein the diffusion of water vapor from a warm walled region into a colder flow produces relative humidity conditions in excess of 100% in the core of the flow (using the configurations and devices discussed with respect to FIG. 1A). These supersaturated humidity conditions can initiate the condensation of water vapor onto particles, which otherwise would not take up water vapor due to their surface tension, and the energy associated with the surface. For example, particles as small as 5 nm generally requires subjecting the particle to an environment with a relative humidity in excess of 130%, as described by the Kelvin relation. The flow exiting the growth tube 202 contains droplets, generally several micrometers in diameter, which result from the condensational enlargement of the airborne particles. These droplets are collected in a small, less than 5 mm diameter spot in the CTD cell 204 maintained at a temperature above the dew point to avoid collecting water. The CTD cell 204 contains, within it, a focusing nozzle (illustrated in FIG. 1A as 103 but not shown in FIG. 2). If designed for a sample flow of in the range of 1 to 2 L/min, the focusing nozzle has a diameter of about generally 1 mm. The flow exiting the nozzle impinges on the wall opposite the nozzle, and then must turn at a right angle toward the side port 215. In FIG. 2 this air sample flow path is indicated by the solid double line. Throughout sample collection, the detector support gasses 240-243 are on, and most of the effluent from the detector 232 and the detector train consisting of 230 and 231 exits through vents 281 and 282. A small portion of the flow from the detectors exits through the CTD 204 to the pump 280, such flow being limited by the capillary in the heated interface 220.

It should be understood that the inlet 201, precut 205, valves 210, 211, 260-264, pump 280, CTD 204, interface 220, detectors 230-232, dryer 234, MFCs 270,271, in FIGS. 2-5 may be provided in a unitary housing (not shown) to allow the system to be portable. Generally, calibration gasses 252, 253, carrier gas source 250 and air source 251, as well as support gases 240-244 would not be provided in the housing, but in some embodiments may be included in the housing.

FIG. 3 illustrates the apparatus 200 of FIG. 2 in analysis mode. FIG. 3 shows the system of FIG. 2 with valves positioned for analysis mode, wherein carrier gas is introduced into the cell and transported to the detectors. Again, solid lines have flows, and dashed lines are stagnant with all such lines representing appropriately sized physical conduits or tubes (whether dashed or solid).

In analysis mode, the particulate material collected in the CTD cell 204 is thermally desorbed into a carrier flow, which passes through the CTD cell 204 to the array of detectors 230-232. The system switches from collection to analysis mode by closing the pumping valve 211, closing the isolation valve 210, and opening the inert carrier gas flow valve 260. Calibration valves 262-264 remain closed. The total flow rate of carrier gas is controlled by the mass flow controller (MFC1) 270. Typically, the carrier gas flow is in the range of 20 $cm^3$/min. The MFC1 270 and valves 260,261 may comprise an interface coupling the carrier gas sources for gases 250, 251 to the CTD cell 204. Downstream of the flow controller MFC1 270, the carrier gas flow is split with nearly equal portions of the flow introduced above the focusing nozzle of the CTD cell (at point 207), and the remainder introduced through into the side port 215 of the CTD cell 204. The carrier gas flow exits the CTD cell 204 to the capillary interface 220 and is subsequently directed to the detector 232 and the detector train 235. In this example, the detector train 235 consists of a combined FID/FPD 230, followed by a dryer 234 and the NDIR $CO_2$ detector 231. It could also consist of an FID, without the FPD, followed by the dryer and NDIR $CO_2$ detector. The dryer is needed to remove water vapor produced in the hydrogen flame of the upstream detector, as described below. In this configuration, the CTD cell is slightly above ambient pressure during analysis, and after passing through the detector array the carrier gas flow vents to the atmosphere through vents 281 and 282.

The interface 220, described in more detail below, includes one or more capillaries to control the flow split, and is heated and optionally chemically passivated to limit deposition of desorbed vapors onto the surface. After a brief purge, the CTD cell 204 is heated, and the collected sample material is thermally desorbed into the carrier gas. Generally, the desorption process may consist of a series of 50° C. temperature steps, from the cell's initial temperature to 400° C. or higher over the course of a few minutes. Non-refractory material evolves during the initial temperatures to 300° C., wherein desorption occurs in an inert carrier gas, such as He. If analysis of refractory material is desired, then at the highest temperatures, at or above about 400° C., the valve 260 is closed and 261 is opened, and the desorption continues in an oxygen-containing gas such as air. Under these conditions, the refractory, soot-like carbonaceous material decomposes and evolves into the carrier gas.

FIG. 4 illustrates the system 200 in calibration mode. FIG. 4 shows the system of FIG. 2 with valves positioned for calibration mode wherein a gas of known concentration is introduced through the CTD cell to the detectors, thereby providing a means to calibrate the detectors in-situ. Again, solid lines have flows, and dashed lines are stagnant with all such lines representing appropriately sized physical conduits or tubes (whether dashed or solid).

The calibration mode is a readily automated mode that provides gaseous standards for the calibration checks of the detectors. In this mode, isolation valve 210 and pumping valve 211 are closed, as is the oxygenated carrier gas flow valve 261. One of the calibration valves, e.g. 262, is opened while the others remain closed. (It should be understood that any of the various calibration valves 262-264 may be opened for calibration.) The calibrant gas flow is controlled by a mass flow controller MFC2 272, and this flow mixes with the inert carrier gas flow. Typically, the flow of inert carrier gas is controlled independently by mass flow controller MFC1 270. These two flows mix prior to introduction into the CTD cell 204. The inert carrier flow is generally the majority of the flow, with a flow rate of about 20 cm3/min, while the calibrant gas flow is varied from 0.1 to 5 cm3/min. The ratio of these two flows may be varied to alter the concentration of analyte, and thereby provide a multipoint calibration. This gas mixture is introduced upstream of the focusing nozzle of the CTD cell 204 at point 207, through the CTD side port 215, and then exits the CTD through the heated interface 220 to the detectors 230-232, exactly as in the analysis step. By using a combination of several calibration gases or gas mixtures, calibrations may be done for each of the detectors employed.

FIG. 5 illustrates an alternative implementation of the system 200*a* for a "passive isolation" configuration for the analysis mode, in which the isolation valve 210 is eliminated, and the pumping valve 211 is replaced by a three-way valve 212. In this configuration, the detector 232 and detector train 235 are operated at slightly below the pressure at the inlet 201. This is accomplished by pulling the flow with a second pump 285 at a fixed flow rate, while limiting the flow delivered by the support gases 240-243. In this configuration, the isolation of the growth tube during the analysis step is achieved through a passive flow split. The collection mode operates exactly as illustrated in FIG. 2, with the air sample being pulled by pump 280 from the inlet, through the optional pre-cutter 205, through the growth tube 202, and through the CTD 204. However, in the analysis mode, the flow paths are as shown in FIG. 5 (with solid lines having flows, and dashed lines are stagnant, with all such lines representing appropriately sized physical conduits or tubes (whether dashed or solid). In analysis mode the sample air stream continues to be pulled from the inlet, through the optional pre-cutter and the growth tube. However, at the point 208 immediately below the exit of the growth tube, it is pulled directly to the pump, bypassing the CTD cell 204. Carrier gas is introduced through the mass flow controller 270 at the point 207 in an amount slightly in excess of that being pulled through the detectors. The majority of the carrier gas flow is pulled through the CTD to the detector train, while the slight excess exits through the sampling line at point 208. This configuration may also be used for the calibration mode, with calibrant gas introduced with the inert carrier gas.

Figure 6B:
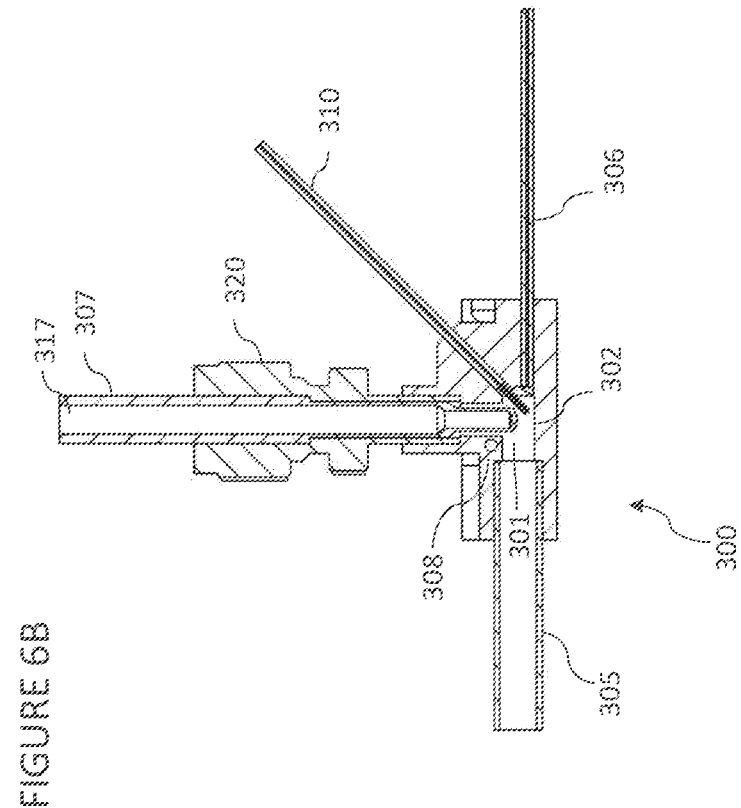
FIG. 6A is a perspective view, and FIG. 6B a cross-sectional view along line I-I in FIG. 6A, of a CTD cell.
Figure 6A:
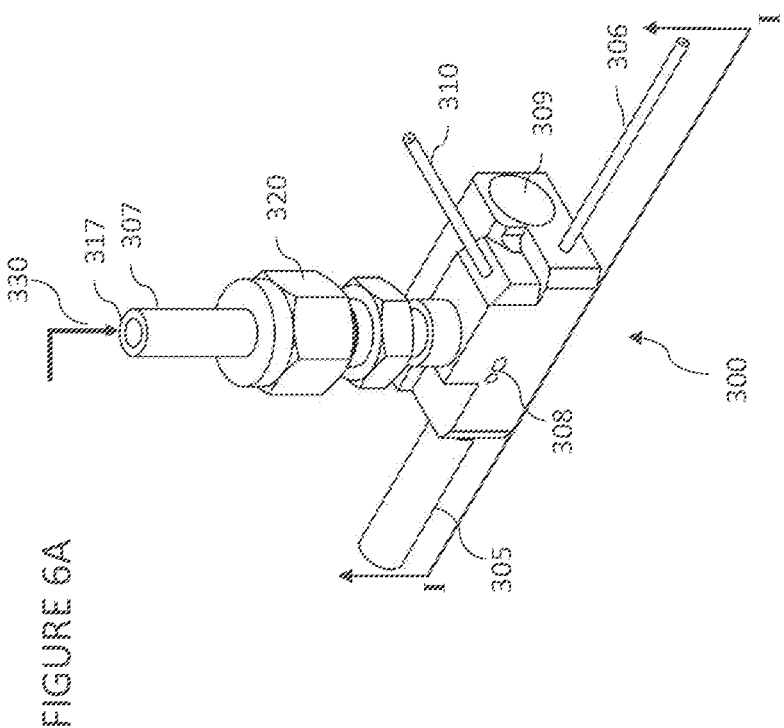

FIG. 6A is a perspective view, and FIG. 6B a cross-sectional view along line I-I in FIG. 6, of a CTD cell 300.

FIGS. 6A and 6B show a CTD cell 300 fabricated from stainless steel and used for the collection and thermal desorption of airborne particulate material. Sample collection is achieved using inertial impaction of the droplet encapsulated particles generated by the condensation growth tube using, as one example, a nozzle tube 307 with an inlet 317 and a constriction at the outlet of the tube 307 tapered to an orifice 301 approximately 1 mm in diameter. Sample flow accelerates as it passes through the orifice 301. This jetting action causes particle laden flows to impinge against the inner surface 302 of the CTD cell 300 whereby said particles are efficiently separated due to the particles inherent enhanced inertia from condensed water. The deposited sample is concentrated into a small spot (at 302) approximately equal in diameter to the nozzle jet diameter. During sample collection, the flow then exits through exit tube 305. The CTD cell 300 has a cavity 309 into which a high-power density cartridge heater (not shown) is inserted to provide rapid heating, while the hole 308 accommodates a thermocouple for temperature monitoring. During sample analysis, the CTD cell 300 is heated by powering the cartridge heater, and carrier gas flow 330 is introduced through the nozzle tube 307, and the side port 305, and exits through port 306. The internal surfaces of the cell may be chemically passivated to reduce surface interactions rendering the stainless steel passages more inert. This CTD cell 300 incorporates a fixed injection port 310 for administering liquid injection-based calibration standards directly on to the point of sample collection 302. By using a single brazed assembly 300 the internal volume and total thermal mass of the cell is minimized. Using a suitable choice of incorporated fittings 320 and tubes 305, 306, 310 the number of compression-fitting-based connections can be limited, thereby increasing the inherent robustness against leaks even at high temperatures and pressures even when using a highly diffusive carrier gas such as Helium.

Figure 7B:
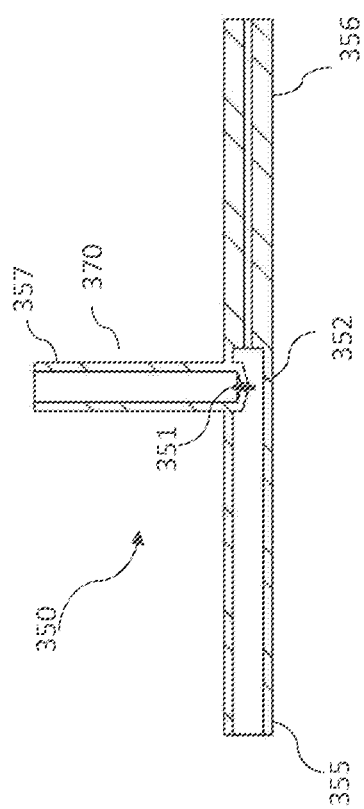
FIG. 7A is a perspective view, and FIG. 7B a cross-sectional view along line II-II in FIG. 7A, of an alternative CTD cell.
Figure 7A:
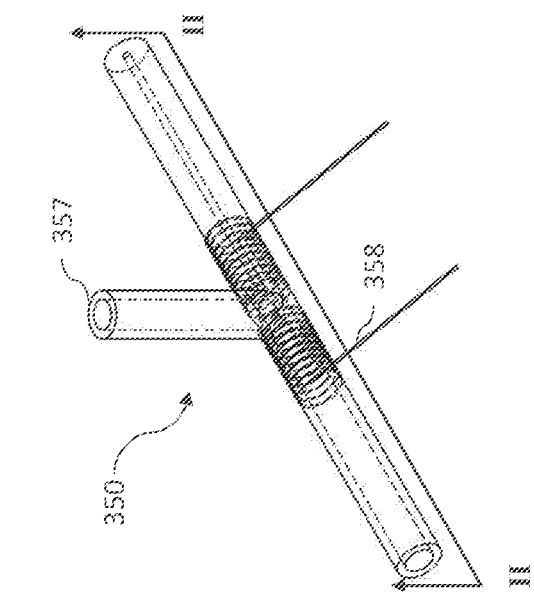

FIG. 7A is a perspective view, and FIG. 7B a cross-sectional view along line II-II in FIG. 7A, of an alternative CTD cell 350.

FIGS. 7A and 7B show CTD cell 350 fabricated from fused quartz tubing, which facilitates higher desorption temperatures than the CTD cell 300 of FIGS. 6A and 6B. CTD cell 350 is comprised of multiple fused quartz capillaries tubes fused into a single assembly that permits heating samples to a maximum temperature of 800° C., to enable recovery of refractory material including elemental carbon and most salts. The high thermal stress stability and limited thermal conductivity of fused quartz facilitates heating of the particle collection region without heating adjacent components. During sampling flow is drawn through the inlet tube 357, impactor nozzle 351 and outlet tube 355 via a pump (not shown). In CTD cell 350, the fused quartz cell directly incorporates the impaction nozzle 351 that concentrates samples into a compact zone 352. Heating of the fused quartz is achieved by external application of heating wire 358 wound around the outside of the sample region of the cell to produce the needed temperatures for complete thermal evolution of collected sample, while maintaining lower temperatures at the tips of the inlet and outlet tubes, 357 and 355. One method of heating is the use of a metal wire with a high temperature coefficient of resistance as heating wire 358 through which current is passed. The change in electrical resistance is directly proportional to the wire temperature. This allows accurate measurement of the real time inherent temperature of the heating wire itself. In one embodiment, a metal with high temperature coefficient of resistivity, e.g. nickel, is used to increase precision in the control of temperature by virtue of larger proportional changes in electrical resistivity per degree of temperature change. The heating coil itself can be monitored though the measurement of its resistance in real time to allow fast temperature ramping and control necessary for making volatility resolved analyses. Evolved sample gases require lower temperatures to maintain the sample in the gas phase.

Figure 8:
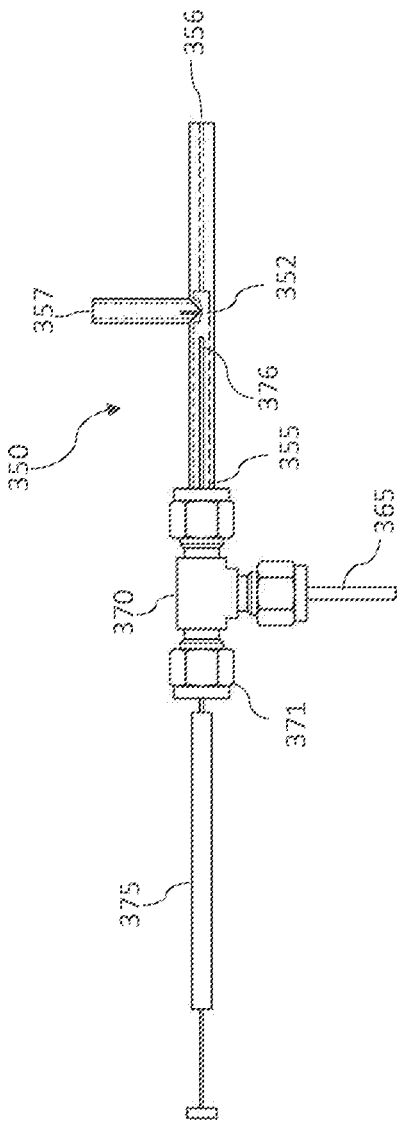
FIG. 8 shows the quartz CTD cell of FIGS. 7A and 7B configured to accommodate the introduction of liquid calibrants.

Both CTD cell designs accommodate the introduction of liquid calibrants. Liquid calibrants, or liquid-based standards, are solutions containing known concentrations of analytes. FIG. 8 shows the quartz CTD cell of FIGS. 7A and 7B configured to accommodate the introduction of liquid calibrants. A known quantity of this standard, typically a few uL, can be injected at the sample collection point, allowed to dry, and then analyzed as if it were a particle sample. This provides a direct means of calibrating the analysis steps of the method, including thermal desorption, vapor transport to the detectors, and quantification by the detectors. For the stainless steel CTD cell 300 of FIGS. 6A and 6B, the application of the liquid calibrant is done by insertion of a needle through the port 310. In contrast to other thermal desorption systems, the CTD cells of this technology provide for in-place desorption in a cell with a small internal volume. The surface on which particulate matter is collected is not physically moved; rather, the heating occurs in-place. Further, for both of CTD cell designs (of FIGS. 6A and 6B and FIGS. 7A and 7B), the internal volume through which the carrier gas flows during the analysis step is less than 1 cm3. At typical carrier gas flow rates of 10 to 20 cm3, this volume is completely swept within a few seconds. This small internal volume allows rapid desorption times, while providing readily detectable concentrations of evolved vapors in the carrier gas flow.

With reference to FIG. 8, for the fused quartz CTD cell 350, it is accomplished by addition of a tee 370 on the exit tube 355, as shown in FIG. 8. The sampling exit tube 355 necessarily has a larger inner diameter to accommodate the sample flow rate while maintaining near atmospheric pressure within the cell (<0.1 bar gauge). By suitable choice of external connections to the cell, the introduction of liquid based solutions containing authentic standards can be achieved through this exit port. In the example shown in FIG. 8, the tee 370 is connected to the exit port 355 with the port of the tee 371 on-axis with the exit tube 355. The port 371 is closed with a re-sealable barrier (not shown, e.g. a silicone septum) through which a syringe needle 375 can be inserted for depositing microliter levels of liquid based chemical standards such that the tip 376 of the needle reaches the point of sample collection 352. The use of a re-sealable barrier (not visible) in the injection port of the tee 370 provides for improved sample integrity because the cell does not need to be opened to make injections. The third port 365 of the tee 370 can be connected to a valve and pump for sampling when not conducting an injection-based calibration. Alternatively, this injection method can be used to deliver an internal standard on top of an ambient sample to measure analyte recovery in the presence of a complex sample. Once the liquid calibrant is applied, the needle 375 is removed, sealing the port 371. Subsequently, the analysis proceeds as described above, providing a calibration of the analysis step of the method.

FIGS. 9A-9C illustrate two implementations of an interface (such as interface 120 or interface 220) for conveying the evolved gasses from the fused quartz CTD cell 350 to the detector(s) during thermal desorption analysis. A similar part can be adapted to mate with the tube 306 of the stainless steel CTD cell 300. FIG. 9A is a perspective view, and FIG. 9B is a plan view, of a heated interface (or splitter) 400 that distributes the flow from the CTD cell 300 or 350 to the parallel detectors. FIG. 9C is a plan view of a heated interface 440 for use with a single detector or detector train.

A heated capillary assembly 400 connects for example CTD cell 350 via its sample outlet port 358 to the capillary inlets of a detector directly, without intervening plumbing connections, using a single brazed stainless assembly 400 with a pair of matched capillary tubes 401,402, (as shown in FIG. 9B). This configuration splits the flow from the CTD cell between two detectors operated in parallel. FIG. 9C shows an alternate interface 440 with a single heated tube 403 for a single detector or detector train. To avoid sample vapors condensing or adsorbing to surfaces, the assembly 400 or 440 may be heated to at least 300° C. and chemically passivated to reduce surface interactions rendering the stainless-steel passages more inert. The thermally evolved sample gas stream can be quantitatively split amongst multiple detectors by using pneumatically balanced metal capillary tubes with either matched inner diameters and defined lengths, or matched lengths and defined inner diameter, or a combination of the two parameters. Metal tubes are used for robustness, temperature control and ease of chemical passivation. For the dual detector configuration FIG. 9B, the two outlet capillaries 401, 402 may be pneumatically matched to achieve the desired passive flow split. In this example, the capillary dimensions of inner diameter and length are matched such that an equal flow split can easily be achieved to better than 5% using standardly available capillary tubing. Compression fittings for connections are used and are able to provide reliable and repeatable leak-free seals. In this example, a stainless steel barrel 406, 407, 408 with larger outer diameter to match a detector's inlet port is permanently attached to the capillary transfer lines such that capillary outlet position is fixed by the barrel location relative to the exits of the capillary tubes 401, 402, 403 providing increased reproducibility when assembling the system. High temperature ferrule options include stainless steel for metal-metal joints 406, 407, 408 and graphite ferrules for glass-metal connections 421, 420, both methods suitable for reliable seals up to 450° C.

Figure 10:
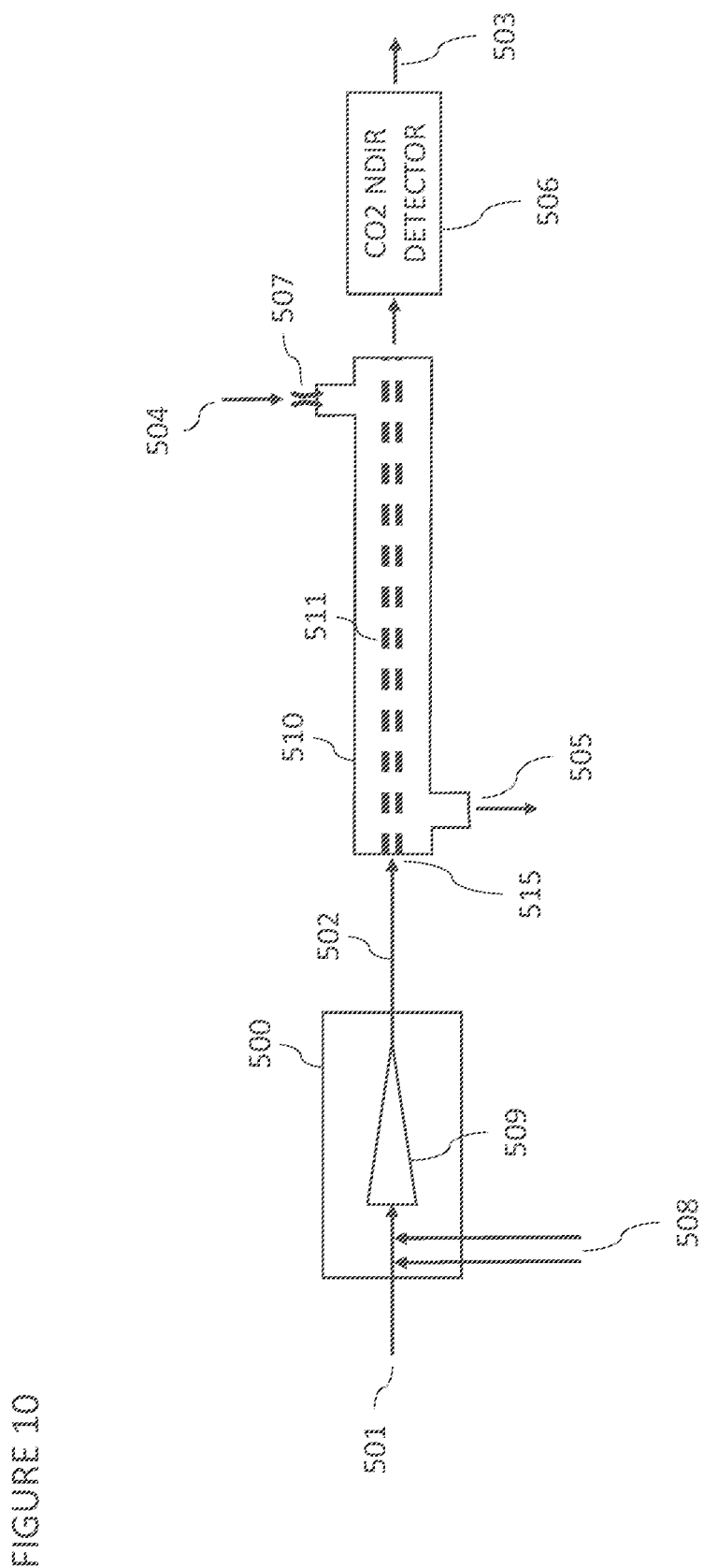
FIG. 10 illustrates an implementation of a single detector train consisting of an FID and NDIR $CO_2$ detectors operated in series with a Nafion-based drier positioned between the two detectors.

FIG. 10 illustrates a detector train comprised of an FID and NDIR detectors in series, with a Nafion(R)-based dryer (Nafion(R) is a sulfonated tetrafluoroethylene based fluoropolymer-copolymer. As described above, analytes are thermally desorbed from the CTD cell and are carried by the inert or oxygen-containing carrier gas at a flow rate of between 5 and 20 cm3/min through an interface to the FID-NDIR detector train 235. The flow 501 exiting the interface (120, 220) enters the detector 500 where it joins the FID support gases 508 (gases 241, 243), consisting of an air flow of 150 to 300 cm3/min, and a hydrogen flow of 15 to 30 cm3/min. The combined flows enter the hydrogen flame of the FID and a housing of the detector 500 is maintained at a temperature of 250 to 300° C. The FID (flame ionization detector) uses a hydrogen flame 509 and assays the organic species. This detector may also be outfitted with a photometric detector (FPD) for simultaneous optical analysis of the hydrogen flame for sulfur species, including decomposition of major inorganic sulfur-containing compounds in atmospheric particles. In either case, within the body of the detector 500, analytes combust within a hydrogen flame, producing a hot (150-250° C.) exhaust flow (approximately 250 cm3/min) saturated with water vapor and containing any CO2 produced. This flow is exhausted through a ⅛" copper transfer line 502 to a dryer and subsequently the sample cell of the NDIR detector 506. Drying the saturated exhaust flow is necessary in order to lower the dew point to below ambient temperature to prevent condensation on optical elements within the NDIR instrument, as well as interference. Hence, it is important to remove water vapor from the flow exiting the FID detector 500 before introduction into the NDIR 506.

The dryer configuration shown in FIG. 10 consists of a sulfonated tetrafluoroethylene based fluoropolymer copolymer based dryer 510 in which the flow exiting the detector 500 flows through a 12" to 48"-long sulfonated tetrafluoroethylene based fluoropolymer-copolymer tube 511. A dry sheath air is introduced at 504, and exits through port 505, providing dry air in a counterflow direction in the shell space surrounding the sulfonated tetrafluoroethylene based fluoropolymer-copolymer tube. This dry air source may be room air pulled through the restriction 507 to drop the pressure (and hence the relative humidity) of the air. Alternatively, it may be recirculated from flow exiting the NDIR detector. Sheath flow is controlled by a restriction element 507 to be at least twice sample flow (i.e., greater than 500 cm3/min). The dryer 510 is maintained at a temperature of up to 100° C. from the flow inlet 515 up to at least the mid-point of its length in order to avoid condensation of water vapor in the exhaust flow, which improves removal of water vapor. CO2 in the dried sample flow is detected by the NDIR 506 and exhausted out the vent 503. NDIR response is calibrated by the introduction of 0.2 to 10 cm3/min of dilute CO2 (1% v/v in air) into the carrier gas upstream of the CTD.

Evaluation of System Performance

Laboratory tests have been conducted to assess the performance of the components of the system, namely the particle collection and thermal desorption efficiency, the volatility separation in the analysis, and the determination of the volatility-resolved oxygen to carbon ratio by means of the coupled FID NDIR analyses. Tests sampling ambient air were also conducted on the fully integrated system.

Figure 11:
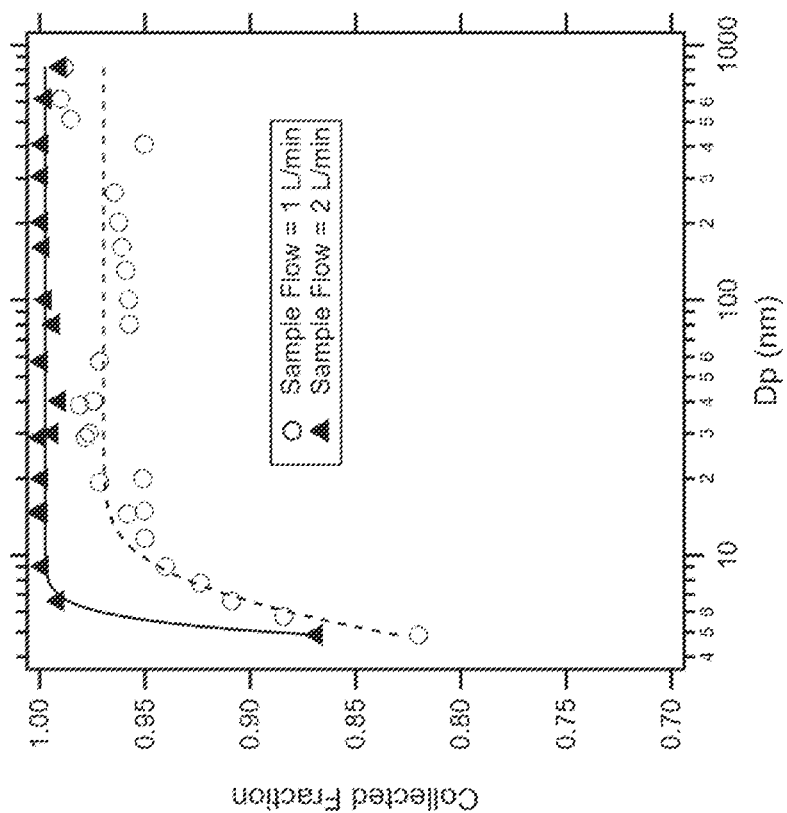
FIG. 11 is a graph showing the particle collection efficiency as a function of particle diameter for the CTD when coupled to a water-based condensational growth tube.

FIG. 11 is a graph of particle diameter (size) relative to the collected fraction of particles. FIG. 11 demonstrates the particle collection efficiency as a function of particle diameter for the CTD cell 300 of FIGS. 6A and 6B when coupled to a water-based condensational growth tube. For all particle sizes larger than 10 nm, collection efficiency is above 95% for sampling flow rates between 1 Lpm and 2 Lpm, which assures a comparable level of collection of fine particle mass in the atmosphere. Similar collection efficiency is achievable with other cell designs by maintaining similar impactor geometry.

Figure 12:
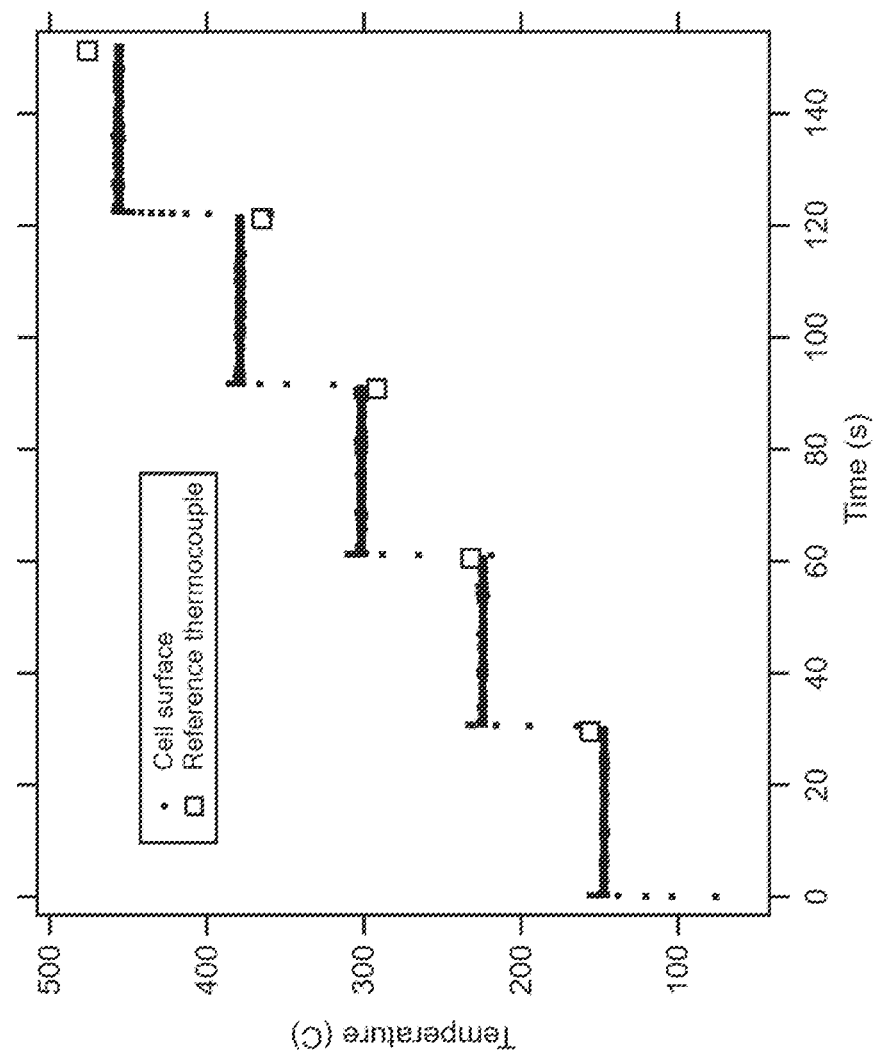
FIG. 12 is a graph showing the rapidity of the thermal stepping of a CTD

FIG. 12 is a graph of time versus temperature for the CTD cell surface and illustrates the ability to rapidly and precisely heat a CTD cell with limited thermal mass such as the CTD cell of FIG. 8. The exterior surface temperature of the FQ cell (line) tracks the heating profile achieving 50° C./sec temperature ramps between 50 and 450° C. with fluctuations of less than 2° C. at each temperature set point reached and held for 30 sec. A reference thermal couple inserted within the cell and positioned above the sample collection point (open symbols) demonstrates that even the air within the cell reaches these set points.

Figure 13:
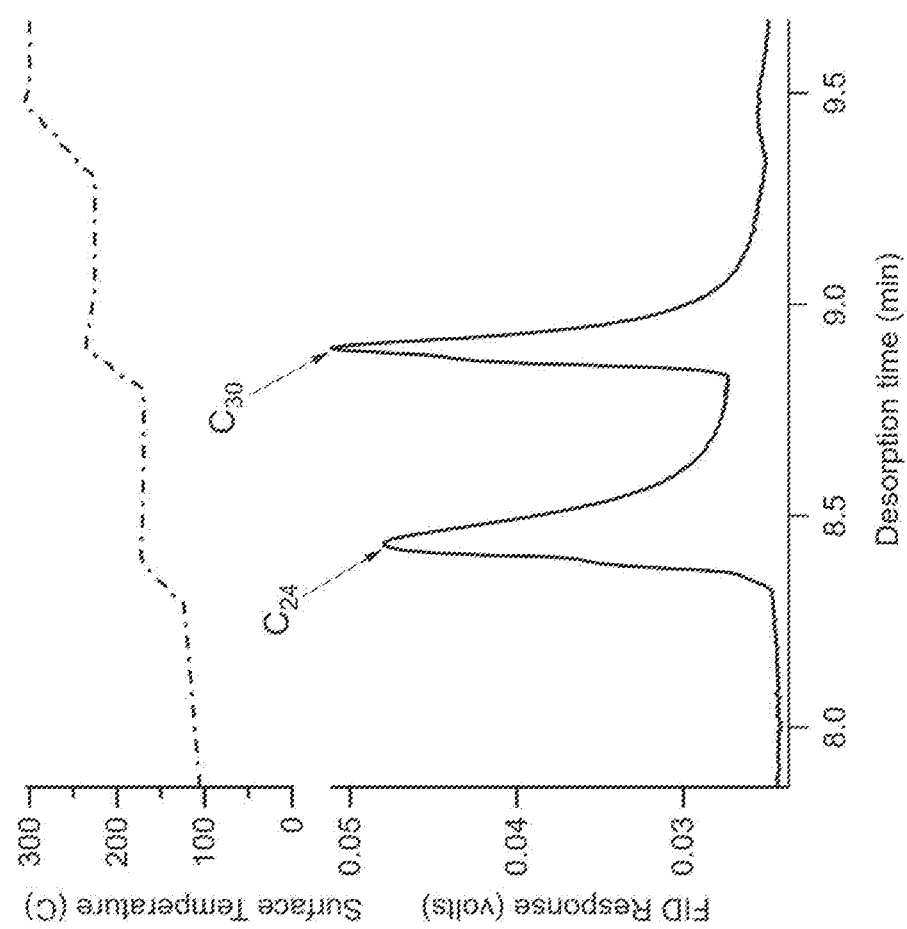
FIG. 13 is a graph showing the distinct volatility separation of two organic carbonaceous compounds, the n-alkanes $C_{24}$ (tetracosane) and $C_{30}$ (triacontane).

FIG. 13 shows plots of the FID response time and surface temperature relative to time, and shows the distinct volatility separation of two organic compounds, $C_{24}$ and $C_{30}$ n-alkanes when co-injected into a CTD cell and heated in two temperature steps that thermally evolve the smaller $C_{24}$ compound at 165° C. followed by the less volatile $C_{30}$ compound at the 225° C. step.

FIGS. 14-18 illustrate the application of the FID-NDIR detector train for determination of the carbon mass and oxygen to the carbon ratio of analyzed organic species. The response of the FID is proportional for aliphatic hydrocarbons to mass of carbon entering the FID, while the NDIR responds to the total $CO_2$ produced by combustion in the FID. A short time lag (<5 seconds) is expected between these signals due to transit time within the dryer.

Figure 14:
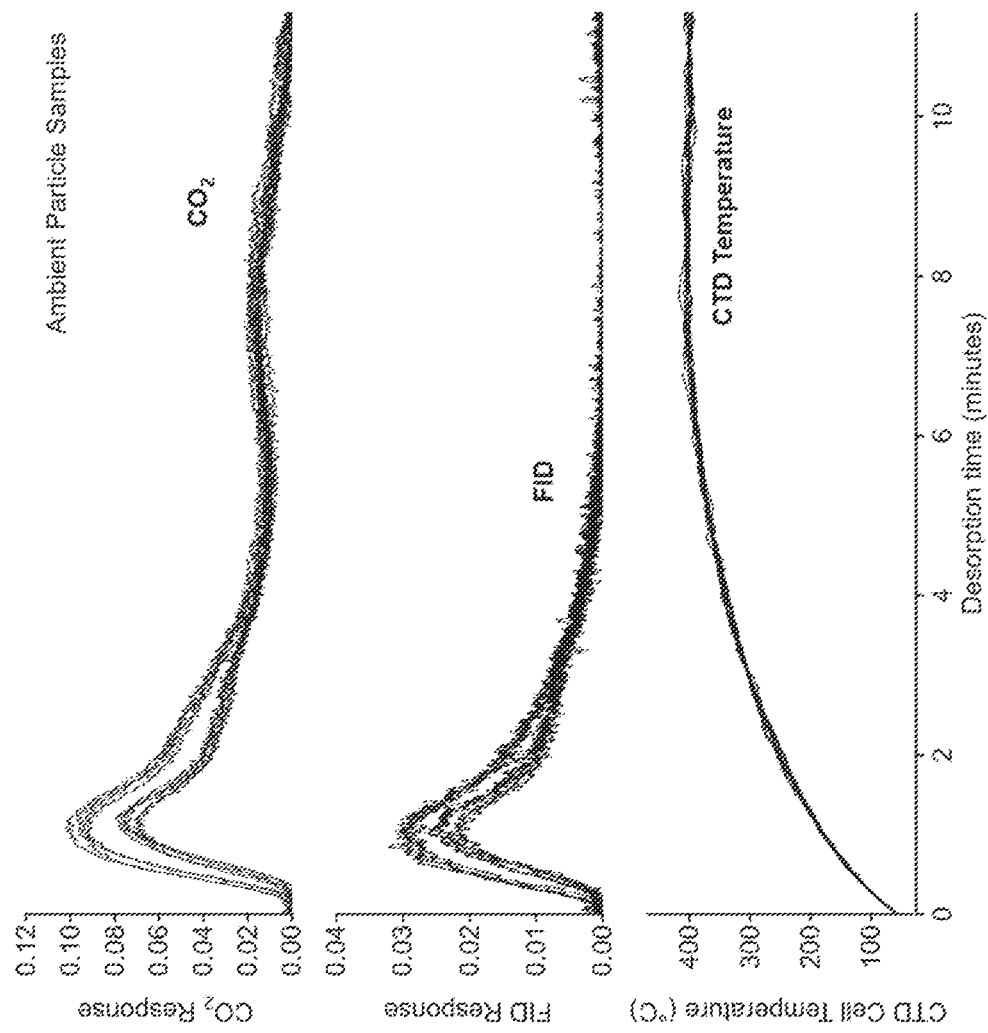
FIG. 14 is a graph showing simultaneous FID and NDIR signals generated from the desorption of a single ambient sample using the FID-NDIR detector train of FIG. 10.

FIG. 14 shows representative signals, corrected for this lag time, for the thermal desorption of samples of ambient particulate matter. Cell temperature (right axis, light gray solid lines) is ramped over 8 minutes from room temperature to 400° C. During this desorption, signals (left axis) are measured by both the NDIR (black solid lines) and the FID (gray dashed lines). Twenty samples are shown, which are observed to vary slightly in their thermal desorption profiles. At different temperatures, the relative signals generated by each detector vary: earlier peaks produce signal on both detectors while analytes evolving at higher temperatures generate little or no FID signal but nevertheless combust to form $CO_2$ that is measured by the NDIR. Detector response is quantified as the area under the generated signal (i.e., units of volt-seconds).

Figure 15:
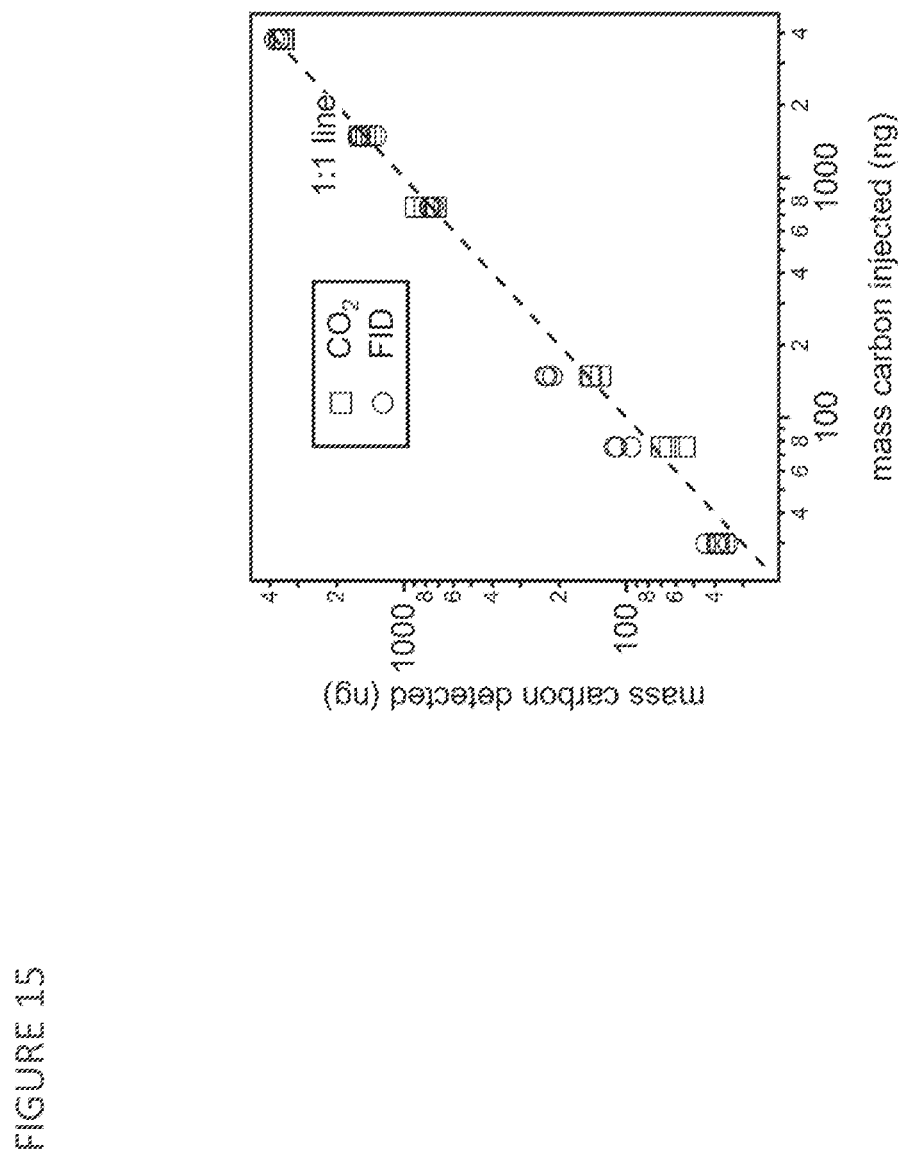
FIG. 15 is a graph showing the recovery for a single alkane, squalene ($C_{28}$), by the FID and NDIR detectors when coupled as illustrated in FIG. 10.

FIG. 15 shows data testing the recovery of carbon by both detectors for a compound representative of hydrocarbons in atmospheric particulate matter, specifically squalene ($C_{30}H_{50}$, having a 24-carbon backbone with 6 double bonds and 6 methyl groups). For this compound, which contains no oxygen, the FID and NDIR response should be equal on a carbon mass basis. FID response was calibrated by n-dodecane, a 12-carbon straight-chain alkane. NDIR response was calibrated using 2 sccm of 1% $CO_2$ as described above. Varying masses of squalene were injected into the CTD and analyzed by the detector train shown in FIG. 10; injections consisted of manual introduction to the CTD of 0.1 to 1.0 µl of dilute solutions of the analyte (0.1-10 mg/ml) in a volatile organic solvent (e.g., dichloromethane). Calibrated FID response (left axis, square markers) was observed to reasonably represent the amount of carbon injected (bottom axis) across the range of 40 to 4000 ng of carbon. The mass of carbon measured as $CO_2$ by the downstream NDIR (left axis, circle markers) was also observed across this range to be approximately equal to the amount of carbon injected, indicating that analytes are completely combusted in the FID flame.

Figure 16:
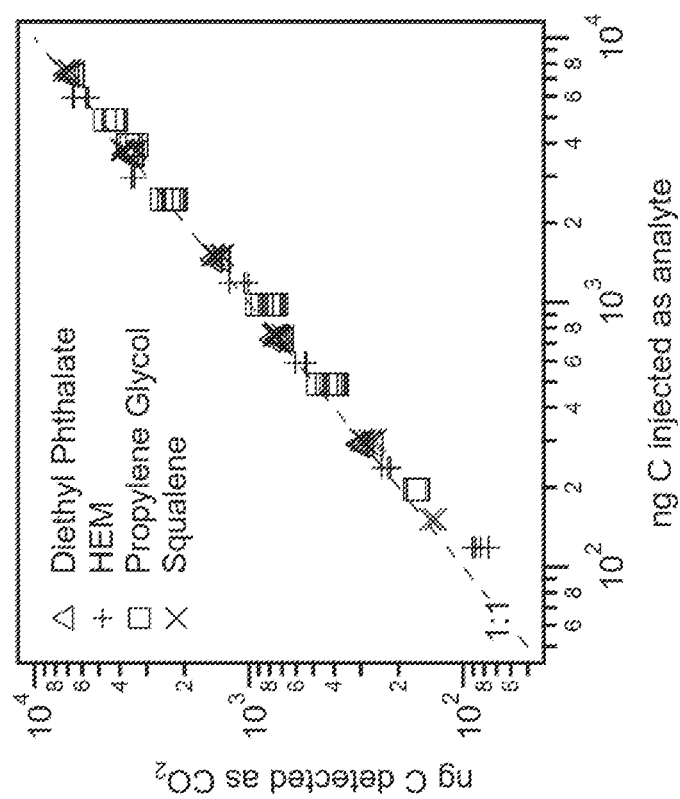
FIG. 16 is a graph showing the recovery for a variety of introduced components spanning a range of chemical formulas and properties by the FID and NDIR detectors when coupled as illustrated in FIG. 10.

Complete combustion within the FID flame was tested for a range of compounds with chemical functional groups representative of atmospheric constituents, shown in FIG. 16. Varying masses of four analytes (squalene, diethyl phthalate, hydroxyethyl methacrylate, and propylene glycol) were injected into the CTD under the same conditions described above. Solvent was purged from the CTD for 3 minutes at room temperature prior to ramped thermal desorption of the CTD up to 300° C. The mass of carbon measured as $CO_2$ by the downstream NDIR (left axis) was observed to be approximately equal to the amount of carbon injected (bottom axis) across range of 70 to 7000 ng of carbon. These results indicate that analytes of a broad range of chemical functionality are completely combusted in the FID flame, and $CO_2$ measured by the FID-NDIR detector train provides a valid measurement of the amount of carbon introduced to an FID that is insensitive to chemical functionality.

A unique aspect of the apparatus and method is the determination of the oxygen-to-carbon ratio of an analyte or mixture of analytes by the FID-NDIR detector train. FID response of a unit of carbon entering the detector is known to be lower for oxygenates than hydrocarbons. Furthermore, FID response per unit carbon has been previously shown to decrease with the addition of each subsequent functional group; different oxygenated chemical functional groups exert different degrees of decreased response. The paired FID-NDIR detector train provides a direct measurement of the FID response per unit carbon by comparing FID response to the mass of $CO_2$ produced in the flame, measured downstream by NDIR. This "FID/$CO_2$" ratio is normalized to that of n-alkanes, which are known to produce the maximum FID signal per unit carbon. This parameter is nominally between 0 and 1 and describes the amount of signal generated by the FID in response to a unit of carbon in a given analyte, relative to maximum sensitivity.

Figure 17:
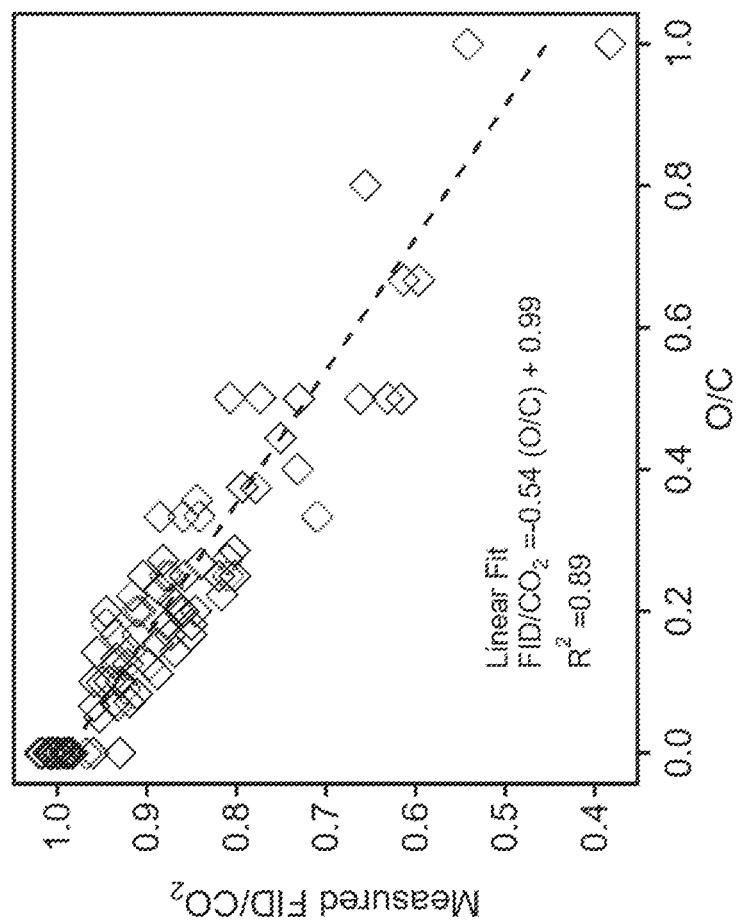
FIG. 17 is a graph showing the determination of oxygen-to-carbon ratio for 89 compounds from the paired FID-NDIR measurement.

FIG. 17 is a graph showing the determination of oxygen-to-carbon ratio for 89 compounds from the paired FID-NDIR measurement. In FIG. 17, the overall decrease in the amount of FID signal generated per unit carbon analyzed is a close function of the oxygen-to-carbon-ratio of an analyte for all individually-introduced analytes except methanol, open diamond. To develop this relationship, 89 analytes representing most chemical functional groups expected for atmospheric constituents were individually measured by being thermally desorbed to the FID-NDIR detector chain.

Figure 18:
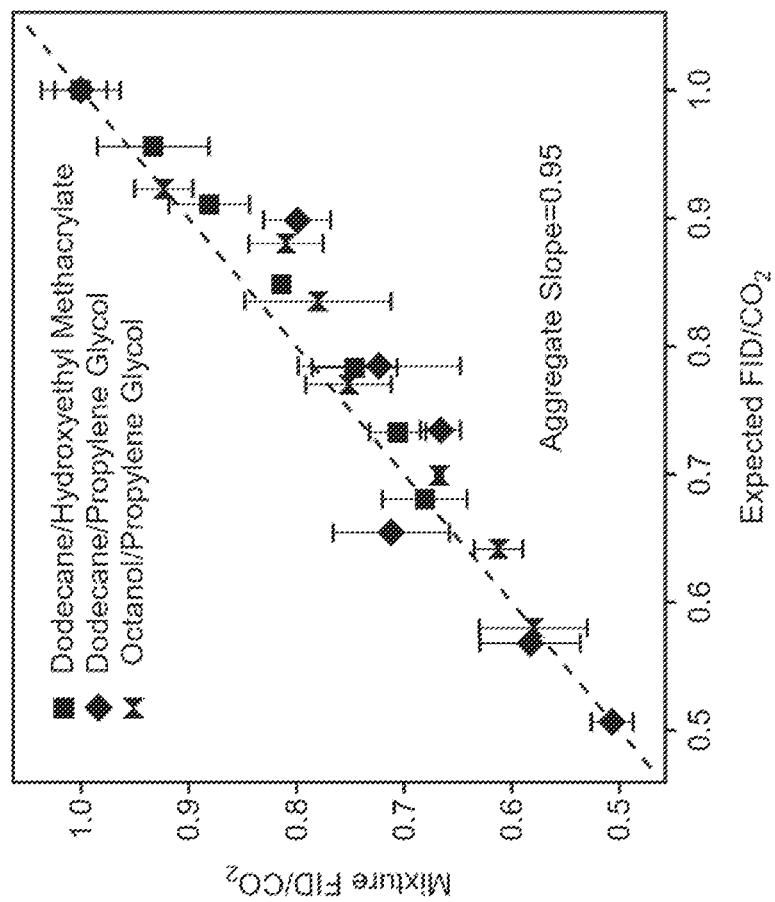
FIG. 18 is a graph comparing the measured FID/$CO_2$ ratio (defined as described in FIG. 17) for organic compound mixtures to the weighted combination of the analytes comprising the mixture.

FIG. 18 is a graph comparing the measured FID/$CO_2$ ratio (defined as described in FIG. 17) for organic compound mixtures to the weighted combination of the analytes comprising the mixture. Each symbol is a different fractional mixture of two components as named in the legend. In FIG. 18, the measured FID/$CO_2$ of mixtures is demonstrated to be the linear combination of mixture components. Three two-component mixtures were introduced containing analytes with similar boiling points but significantly different individually measured FID/$CO_2$ ratios. Mixtures were injected manually into the CTD at concentrations of roughly 1 mg/ml and desorbed for analysis by the FID-NDIR detector train; similar boiling points ensured both components of the mixture were evolved at approximately the same time and simultaneously assayed by the FID-NDIR detector train. Each mixture was analyzed at seven different relative compositions, in which 0 to 100% of the carbon present in the mixture was contributed from one component, with each level of each mixture injected and quantified in triplicate.

FIG. 18 is a graph comparing the measured FID/$CO_2$ ratio (defined as described in FIG. 17) for organic compound mixtures to the weighted combination of the analytes comprising the mixture. Each symbol is a different fractional mixture of two components as named in the legend. In FIG. 18, the observed FID/$CO_2$ of the mixture (left axis) is compared to the expected FID/$CO_2$ of the mixture (bottom axis), calculated as the individually-measured FID/$CO_2$ of each analyte weighted by the fraction of carbon each analyte contributed to the mixture. This comparison falls near the 1:1 line as expected. These results demonstrate that FID-NDIR detector train responds to mixtures as the linear combination of their components, so this detector train can reasonably be used to interrogate mixtures such as atmospheric particles.

Figure 19:
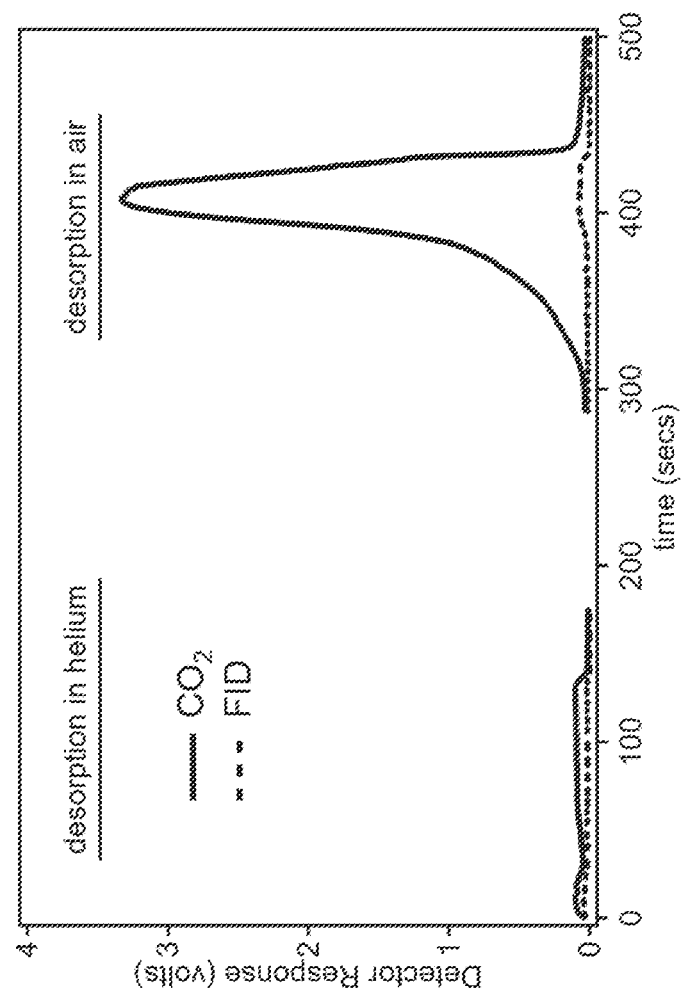
FIG. 19 is a graph showing detection of refractory carbon through introduction of oxygen into the carrier gas, with heating of the CTD to higher temperatures.

FIG. 19 is a graph showing detection of refractory carbon through introduction of oxygen into the carrier gas, with heating of the CTD to higher temperatures. An additional capability of the FID-NDIR detector train is the measurement of refractory carbon through the introduction of an oxygen-containing gas. In FIG. 19, thermal desorption and subsequent analysis by the FID-NDIR detector train is demonstrated for two desorption cycles following a multi-day period of ambient sampling. No sampling occurred immediately prior to these cycles, so these data represent only residual sample remaining in the cell following previous desorptions (i.e., instrument blanks). The first desorption cycle uses an inert gas (helium) as carrier gas with a temperature ramp up to 400° C.; no significant signal is observed by either the FID (dashed gray line) or as $CO_2$ measured by NDIR (solid black line). The subsequent desorption cycle (up to the same temperature) uses air as a carrier gas. In the second cycle, significant signal is recorded by the NDIR, despite only minor signals measured by FID. These data indicate that refractory carbon is evolving in the oxygenated atmosphere through the formation of $CO_2$ or other highly oxygenated carbonaceous gases that generate little or no signal from an FID. The FID-NDIR detector train is therefore a feasible way to measure refractory carbon using thermal desorption in an oxygen-containing atmosphere.

Figure 20:
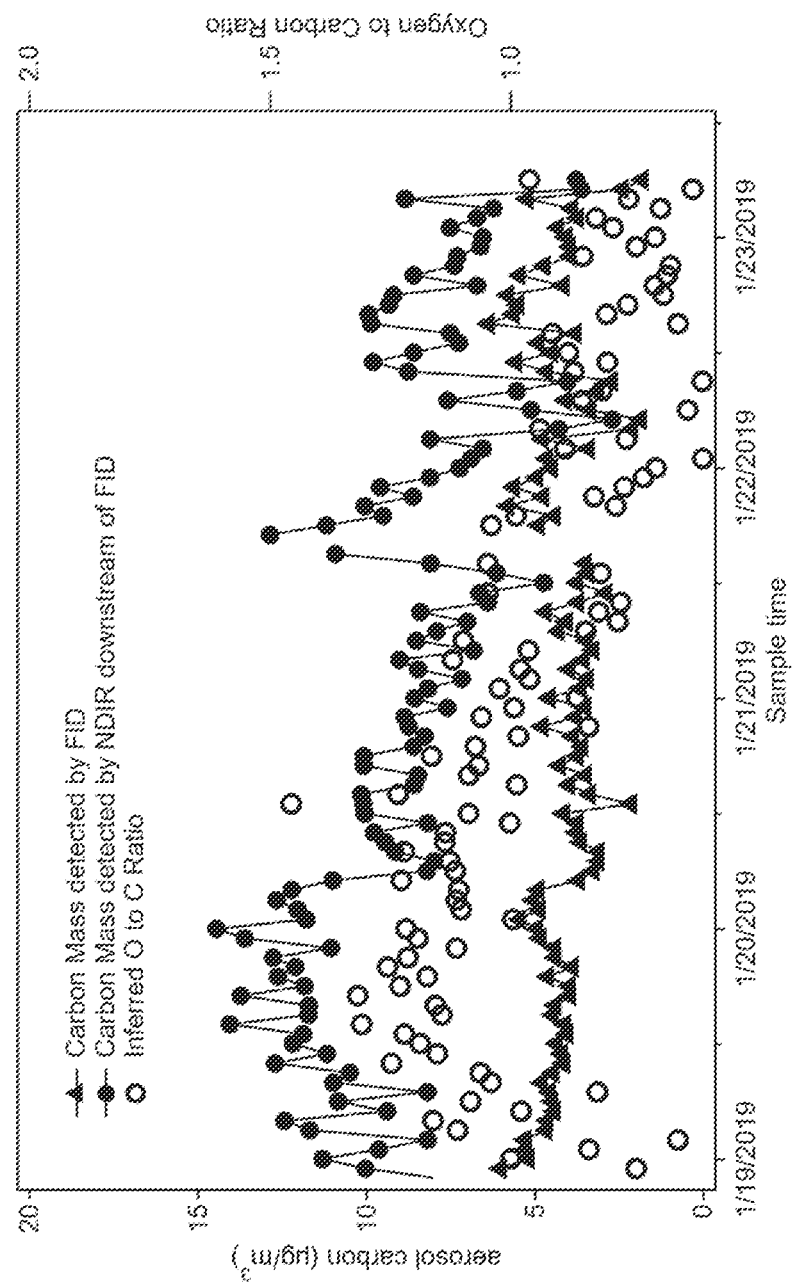
FIG. 20 is a graph showing reduced data from the FID-NDIR detector pair for sampled ambient aerosol over a four-day sampling period, wherein the O:C ratio is calculated as shown in FIG. 17.

FIG. 20 is a graph showing reduced data from the FID-NDIR detector pair for sampled ambient aerosol over a four-day sampling period, wherein the O:C ratio is calculated as shown in FIG. 17. FIG. 20 demonstrates sample data from the sampling of ambient atmospheric particles, their thermal desorption, and their analysis by FID-NDIR. Ambient particles in the urban area of Blacksburg, Va. were collected and analyzed for their organic carbon content and oxygen-to-carbon hourly for four days. Carbon measured as CO2 by the NDIR (left axis, black solid line and circles) is a measured of total aerosol carbon, while that measured by FID (left axis, gray dashed line and squares) is lower. This result is expected of aerosol containing some oxygenated components due to their decreased FID sensitivity. These measurements are combined to estimate the oxygen-to-carbon ratio (right axis, open diamonds) of the organic carbon, based on the relationship shown in FIG. 17. These data provide a representative proof-of-concept of the approaches described herein.

The apparatus and method described herein comprise an automated means to chemically characterize airborne particulate matter through a condensationally enhanced collection of this particulate matter in a focused spot of particles as small as a few nanometers in diameter; and the subsequent thermal desorption of this particulate material and its analysis by one or more detectors, such as those commonly used on gas chromatography systems. Unique aspects of the method include: (1) focused, low-pressure drop collection of ambient particulate matter, including particles as small as a few nanometers in diameter; (2) coupling this collection to a controlled thermal desorption and one or more commonly used gas detectors to determine the mass of target compounds contained in the collected material; (3) using coupled FID and CO2 detection of evolved vapors to assay both the oxygen-to-carbon ratio and the total mass of carbon in the collected material; and (4) further providing such analyses as a function of the volatility of the particulate matter. For the complex mixture that comprises atmospheric aerosols, these are arguably the most important characteristics of the organic fraction. The modularity and flexibility of the method, and its reliance on widely available detectors developed for gas chromatography, extends the potential application of this method to any detector compatible to gas chromatography. Examples include ambient pressure detectors, such as an electrolytic conductivity detector (ELCD) for measurement of halogen content, or below-ambient detectors, such as mass spectrometers Finally, the method provides for automated, in-situ calibration of the detectors, and for direct analysis of the complete process through liquid calibrants introduced directly into the collection cell. These features, the high-efficiency condensational enhanced, focused particle collection; the controlled thermal desorption; the use of commonly used gas chromatography detectors; the coupling of FID and NIDR detectors to infer oxygen to carbon ratio; and the automated calibration of the detectors with gas standards, combine to make a unique, robust and autonomous system.

In another aspect, the technology includes a means for evaluating the chemical composition of airborne particles. The means for evaluating includes means for sequentially collecting and analyzing airborne particles in-situ. The means for collecting includes a means for introducing airborne particles in a gas flow through an inlet. The means for collecting includes means for enlarging the airborne particles through water condensation. The means for collecting further includes means for accelerating the gas flow containing enlarged particles onto a surface to collect enlarged particles in a focused area on the surface. The means for evaluating includes means for analyzing the enlarged particles. The means for analyzing includes means for isolating the surface from the inlet. The means for analyzing includes means for passing an inert or oxygen containing carrier gas over the surface. The means for evaluating includes means for heating the surface to thermally desorb collected particles on the surface into the carrier gas, thereby forming an evolved vapor including the chemical constituents and decomposition products of the collected particles. The means for evaluating includes means for transporting the evolved vapor through a heated interface into one or more detectors. The means for evaluating includes means for assaying the evolved vapor as a function of a desorption temperature.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the detailed description of the present subject matter, numerous specific details are set forth in order to provide a thorough understanding of the present subject matter. However, it will be clear to those of ordinary skill in the art that the present subject matter may be practiced without such specific details.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for evaluating the chemical composition of airborne particles, comprising:
    sequentially collecting and analyzing airborne particles in-situ, including collecting the particles by:
        introducing airborne particles in a gas flow through an inlet into a growth tube;
        enlarging the airborne particles through water condensation at least partially within a region of water vapor saturation in the growth tube; and
        accelerating the gas flow containing enlarged particles from the growth tube onto a surface to collect enlarged particles in a focused area on the surface by passing the flow through an orifice; and
- analyzing the enlarged particles by:
  - isolating the surface from the inlet;
  - passing a carrier gas over the surface;
- heating the surface to thermally desorb collected particles on the surface into the carrier gas, thereby forming an evolved vapor including the chemical constituents and decomposition products of the collected particles;
- transporting the evolved vapor through a heated interface into one or more detectors; and
- assaying the evolved vapor as a function of a desorption temperature.

2. The method of claim 1 further including repeating the collecting and analyzing automatically using a controller including switching between the sequentially collecting and analyzing by controlling one or more valves, gas flows and heaters.

3. The method of claim 1 wherein the heating of the surface comprises heating the surface in a stepwise manner, such that the surface temperature held steady for a prescribed period of time prior to a next temperature increase.

4. The method of claim 1 wherein the assaying is performed using a flame ionization detector connected to a detector for carbon dioxide.

5. The method of claim 4 wherein the assaying includes removing water vapor in the flow exiting the flame ionization detector.

6. The method of claim 4 wherein an oxygen to carbon ratio in evolved vapors in the flow exiting the flame ionization detector is determined from a ratio in detectable carbon mass from the flame ionization detector to a mass of carbon detected as carbon dioxide.

7. The method of claim 6 wherein the mass of carbon and the oxygen to carbon ratio in the evolved vapors is determined as a function of the desorption temperature.

8. The method of claim 1 further including partially replacing the inert carrier gas with an oxygen-bearing carrier gas to evolve a refractory carbonaceous material.

9. The method of claim 1 further including calibrating the one or more detectors by introducing gas standards into one or more detectors.

10. The method of claim 1 further including calibrating the one or more detectors introducing liquid standards into a collection cell.

11. The method of claim 1 wherein passing an inert carrier gas over the collected particles includes introducing the carrier gas through the orifice and through a side port of a collection cell and constraining the flow to exit through a second side port of the collection cell.

12. The method of claim 1 wherein the surface is in a collection cell and the isolating comprises closing a valve placed between the collection cell and the inlet.

13. The method of claim 1 wherein the surface is in a collection cell, and wherein the isolating comprises redirecting the flow containing the condensationally enlarged particles to an exhaust to bypass the collection cell, and simultaneously introducing an excess of carrier gas above the orifice.

14. The method of claim 1 wherein said introducing includes introducing at the inlet having at an ambient pressure, and wherein a pressure at the surface is within a few percent of the ambient pressure.

15. An apparatus, comprising:
- a sample flow inlet;
- one or more condensational growth tubes coupled to the sample flow inlet, at least a portion of the one or more condensational growth tubes including a region of water vaper supersaturation;
- at least one vacuum valve;
- a collection and thermal desorption (CTD) cell adapted to receive an output of the one or more condensational growth tubes onto a surface of the CTD cell through an acceleration nozzle;
- a carrier gas source and an interface including a carrier gas valve configured to provide carrier gas into the CTD cell;
- a heater coupled to the CTD cell configured to selectively heat the CTD cell;
- a heated transport interface coupled between the CTD cell and one or more gas detectors or detector trains; and
- a controller coupled to the carrier gas and vacuum valves, the heater, the heated transport interface, the one or more condensational growth tubes, and the CTD cell, the controller configured to operate the valves, the controlled heater, the heated transport lines, the one or more condensational growth tubes, and the CTD cell in at least an in-situ sequential collection mode and analysis mode.

16. The apparatus of claim 15 wherein the one or more detectors comprises a flame ionization detector (FID).

17. The apparatus of claim 16 further including a nondispersive infrared detector (NDIR) coupled to the FID detector.

18. The apparatus of claim 15 wherein the one or more detectors comprises a flame ionization detector (FID) and a nondispersive infrared detector (NDIR), and further including an interface configured to remove water vapor produced by a hydrogen flame of the flame ionization detector prior to introduction into the nondispersive infrared detector.

19. The apparatus of claim 15 further including an interface configured to introduce either gas or liquid standards from a gas or liquid standards source to the CTD cell.

20. The apparatus of claim 15 wherein the CTD cell is fabricated from fused quartz.

21. The apparatus of claim 15 wherein the CTD cell is fabricated from stainless steel and has surfaces which are chemically passivated.

22. The apparatus of claim 15 wherein the CTD cell has an internal volume of less than 1 $cm^3$.

* * * * *